US012670359B2

(12) United States Patent
Jiang et al.

(10) Patent No.: US 12,670,359 B2
(45) Date of Patent: Jun. 30, 2026

(54) NEURAL NETWORK CONSTRUCTION METHOD AND APPARATUS

(71) Applicant: HUAWEI TECHNOLOGIES CO., LTD., Guangdong (CN)

(72) Inventors: Chenhan Jiang, Shenzhen (CN); Hang Xu, Hong Kong (CN); Zhenguo Li, Hong Kong (CN); Xiaodan Liang, Guangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 835 days.

(21) Appl. No.: 17/993,430

(22) Filed: Nov. 23, 2022

(65) Prior Publication Data

US 2023/0089380 A1 Mar. 23, 2023

Related U.S. Application Data

(63) Continuation of application No. PCT/CN2021/082222, filed on Mar. 23, 2021.

(30) Foreign Application Priority Data

May 25, 2020 (CN) .......................... 202010448652.7

(51) Int. Cl.
*G06N 3/04* (2023.01)
*G06F 18/214* (2023.01)
(Continued)

(52) U.S. Cl.
CPC ............. *G06N 3/04* (2013.01); *G06F 18/214* (2023.01); *G06N 3/045* (2023.01); *G06N 3/08* (2013.01);
(Continued)

(58) Field of Classification Search
CPC .......... G06N 3/04; G06N 3/044; G06N 3/045; G06N 3/0455; G06N 3/0464; G06N 3/063;
(Continued)

(56) References Cited

U.S. PATENT DOCUMENTS

2019/0272451 A1* 9/2019 Lin ......................... G06F 18/22
2020/0143231 A1 5/2020 Fusi et al.
(Continued)

FOREIGN PATENT DOCUMENTS

CN 110175671 A 8/2019
CN 110363810 A 10/2019
(Continued)

OTHER PUBLICATIONS

Wei Wen et al, "AutoGrow: Automatic Layer Growing in Deep Convolutional Networks," arxiv.org, Cornell University Library, 201 Olin Library Cornell University Ithaca, NY 14853, Jun. 7, 2019 (Jun. 7, 2019), XP081374300, 10 pages.
(Continued)

*Primary Examiner* — Shane D Woolwine

(74) *Attorney, Agent, or Firm* — WOMBLE BOND DICKINSON (US) LLP

(57) ABSTRACT

A neural network construction method and apparatus in the field of artificial intelligence, to accurately and efficiently construct a target neural network. The constructed target neural network has high output accuracy, may be further applied to different application scenarios, and has a strong generalization capability. The method includes: obtaining a start point network, where the start point network includes a plurality of serial subnets; performing at least one time of transformation on the start point network based on a preset first search space to obtain a serial network, where the first search space includes a range of parameters used for trans- (Continued)

forming the start point network; and if the serial network meets a preset condition, training the serial network by using a preset dataset to obtain a trained serial network; and if the trained serial network meets a termination condition, obtaining a target neural network based on the trained serial network.

20 Claims, 15 Drawing Sheets

(51) Int. Cl.

| | |
|---|---|
| *G06N 3/045* | (2023.01) |
| *G06N 3/0464* | (2023.01) |
| *G06N 3/063* | (2023.01) |
| *G06N 3/08* | (2023.01) |
| *G06N 3/082* | (2023.01) |
| *G06N 3/096* | (2023.01) |
| *G06V 10/44* | (2022.01) |
| *G06V 10/80* | (2022.01) |
| *G06V 10/82* | (2022.01) |
| *G06V 10/94* | (2022.01) |
| *G06V 10/96* | (2022.01) |

(52) U.S. Cl.
CPC ............. *G06N 3/082* (2013.01); *G06N 3/096* (2023.01); *G06V 10/454* (2022.01); *G06V 10/82* (2022.01); *G06V 10/94* (2022.01); *G06V 10/96* (2022.01); *G06N 3/0464* (2023.01); *G06N 3/063* (2013.01); *G06V 10/806* (2022.01)

(58) Field of Classification Search
CPC .......... G06N 3/08; G06N 3/082; G06N 3/084; G06N 3/091; G06N 3/092; G06N 3/094; G06N 3/096; G06N 20/00; G06N 20/10; G06N 20/20; G06V 10/454; G06V 10/82; G06V 10/94; G06V 10/96; G06V 10/806; G06F 18/241; G06F 18/214
See application file for complete search history.

(56) References Cited

U.S. PATENT DOCUMENTS

| | | | | |
|---|---|---|---|---|
| 2020/0234132 A1* | 7/2020 | Tan | ........................ | G06N 3/063 |
| 2021/0256391 A1* | 8/2021 | Karlinsky | ............ | G06N 3/0475 |
| 2021/0273954 A1* | 9/2021 | Linton | ................. | G06N 3/0455 |

FOREIGN PATENT DOCUMENTS

| | | |
|---|---|---|
| CN | 111126564 A | 5/2020 |
| CN | 111797983 A | 10/2020 |

OTHER PUBLICATIONS

Zeming Li et al., "DetNet: A Backbone network for Object Detection," arXiv: 1804.06215v2 [cs.CV] Apr. 19, 2018, 17 pages.
Yukang Chen et al., "DetNAS: Backbone Search for Object Detection," arXiv: 1903.10979v4 [cs.CV] Dec. 30, 2019, 12 pages.
Golnaz Ghaisi et al., "NAS-FPN: Learning Scalable Feature Pyramid Architecturefor Object Detection," arXiv: 1904.07392v1 [cs. CV] Apr. 16, 2019, 10 pages.

* cited by examiner

CONT.
FROM
FIG. 10A

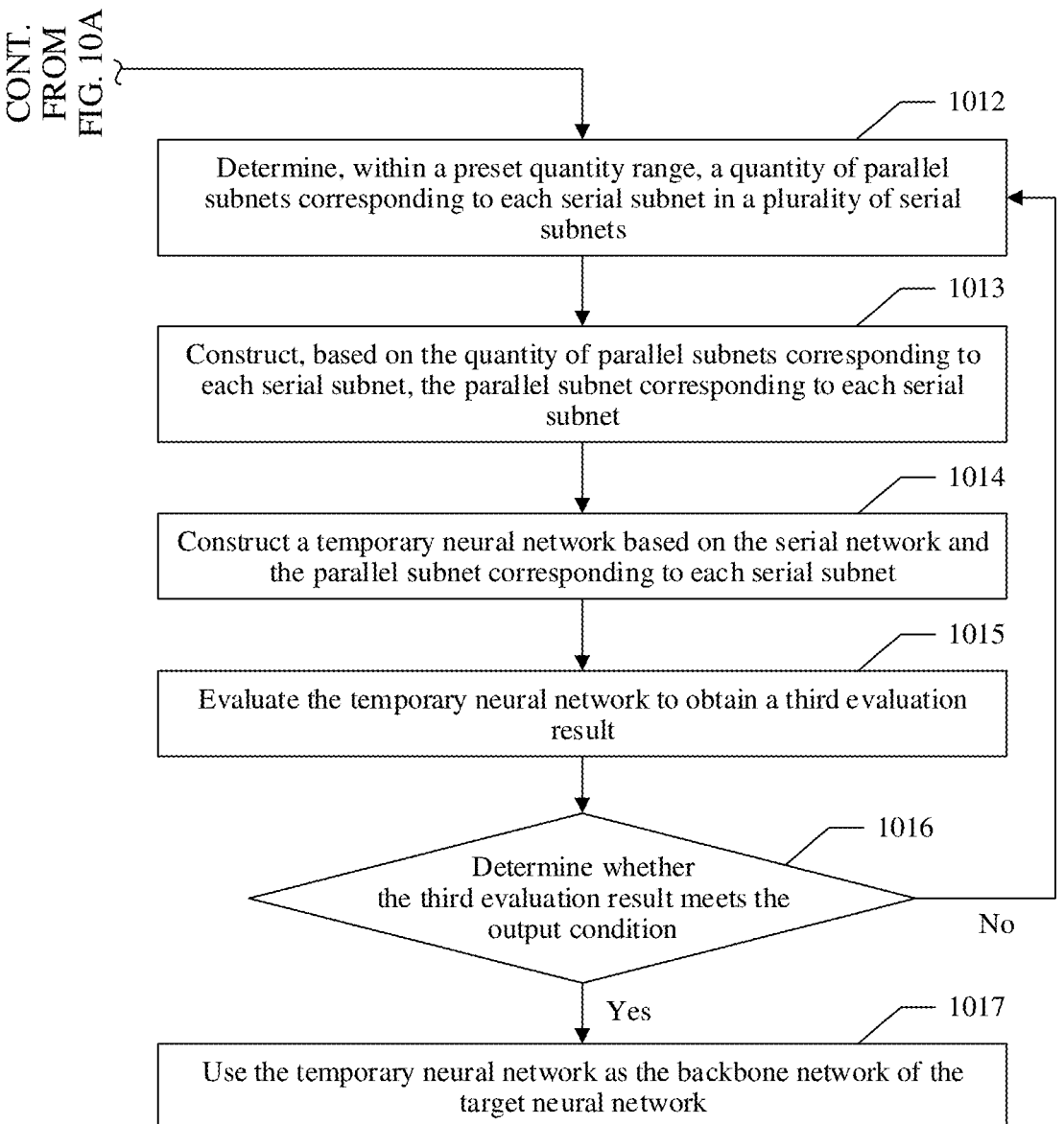

1012

Determine, within a preset quantity range, a quantity of parallel subnets corresponding to each serial subnet in a plurality of serial subnets

1013

Construct, based on the quantity of parallel subnets corresponding to each serial subnet, the parallel subnet corresponding to each serial subnet

1014

Construct a temporary neural network based on the serial network and the parallel subnet corresponding to each serial subnet

1015

Evaluate the temporary neural network to obtain a third evaluation result

1016

Determine whether the third evaluation result meets the output condition

No

Yes

1017

Use the temporary neural network as the backbone network of the target neural network

FIG. 10B

NEURAL NETWORK CONSTRUCTION METHOD AND APPARATUS

CROSS-REFERENCE TO RELATED APPLICATIONS

This is a continuation of International Patent Application No. PCT/CN2021/082222, filed on Mar. 23, 2021, which claims priority to Chinese Patent Application No. 202010448652.7, filed on May 25, 2020. The disclosures of the aforementioned applications are hereby incorporated by reference in their entireties.

TECHNICAL FIELD

This disclosure relates to the field of artificial intelligence, and in particular, to a neural network construction method and apparatus.

BACKGROUND

In the field of artificial intelligence, computer vision technologies are widely used in scenarios such as autonomous driving, mobile phone terminals, and security surveillance. A backbone network is an important network architecture in a neural network, is usually not associated with a task of the neural network, and may be a feature extraction network, a residual network, or the like that is required for most tasks. A common computer vision task is mainly used for object detection and semantic segmentation. Generally, feature extraction may be first performed on input information by using the backbone network, and then an extracted feature is input to a prediction module to obtain a prediction result. However, as complexity of a to-be-processed scenario increases, a requirement for a feature extraction capability of the backbone network also increases.

However, in a conventional solution, a feature extraction network of a classification network that is manually designed or obtained through searching is usually used as a backbone network, or a backbone network is obtained by stacking construction units obtained through searching. In the conventional technology, an obtained backbone network usually has low output accuracy, and efficiency of obtaining the backbone network is low. In addition, the backbone network obtained through stacking can only be used in a fixed scenario. In different scenarios, construction units need to be searched again and stacked to obtain a backbone network. A generalization capability is weak.

SUMMARY

This disclosure provides a neural network construction method and apparatus, to accurately and efficiently construct a target neural network. The constructed target neural network has high output accuracy, may be further applied to different application scenarios, and has a strong generalization capability.

According to a first aspect, this disclosure provides a neural network construction method, including: obtaining a start point network, where the start point network includes a plurality of serial subnets; performing at least one time of transformation on the start point network based on a preset first search space to obtain a serial network, where the first search space includes a range of parameters used for transforming the start point network; and if the serial network meets a preset condition, training the serial network by using a preset dataset to obtain a trained serial network; and if the trained serial network meets a termination condition, obtaining a target neural network based on the trained serial network.

In an embodiment of the disclosure, the at least one time of transformation may be performed on the start point network to obtain the serial network. The serial network is trained by using the preset dataset only when the serial network meets the preset condition, and a transformed start point network does not need to be trained each time the start point network is transformed. This reduces a workload and improves efficiency of obtaining the target neural network. In addition, a transformed start point network may inherit a weight of the start point network before transformation and the inherited weight is updated by using a lightweight dataset, to quickly train the transformed start point network, quickly obtain a serial network that meets a requirement, and further improve efficiency of obtaining the target neural network. In addition, in this disclosure, the start point network may be transformed, so that output accuracy of the target neural network is higher. In addition, the neural network construction method provided in this disclosure may adapt to different scenarios, and the serial network may be searched for based on different requirements. The neural network construction method provided in this disclosure can be oriented to more complex visual tasks and has a strong generalization capability. Therefore, costs of constructing different neural networks can be reduced, output accuracy of the constructed neural networks can be improved, and user experience can be improved.

In an embodiment, one of the at least one time of transformation performed on the start point network based on the first search space includes: searching the first search space for a transformation policy, where the transformation policy includes a group of parameters used for transforming the start point network; transforming the start point network according to the transformation policy to obtain a transformed start point network, where a weight of the transformed start point network inherits the weight of the start point network before transformation; updating the weight of the transformed start point network by using the lightweight dataset, to obtain a start point network with an updated weight, where data included in the preset dataset is more than data included in the lightweight dataset; evaluating the start point network with the updated weight to obtain a first evaluation result; and if the first evaluation result meets a preset update condition, re-searching the first search space for a transformation policy, and re-transforming the start point network before transformation according to the re-found transformation policy; or if the first evaluation result does not meet the preset update condition, using the start point network with the updated weight as the serial network.

Therefore, in an embodiment of the disclosure, when the start point network is transformed, the transformed start point network may inherit the weight of the start point network before transformation, and the weight is updated based on the lightweight dataset. This can reduce a weight training process, improve efficiency of subsequently obtaining the serial network, and further improve efficiency of obtaining the target neural network. In addition, the start point network may be transformed by searching the first search space for the transformation policy. The first search space includes information related to each feature stage in the start point network, such as a depth and a width. In addition, generally, the transformation policy re-found in the first search space is different from a transformation policy used to transform the start point network last time, to avoid meaningless transformation and improve efficiency of obtaining a start point network that does not meet the update condition.

In an embodiment, the method further includes: if the serial network does not meet the preset condition, using the serial network as a new start point network; or if the trained serial network does not meet the termination condition, using the trained serial network as a new start point network; and updating the first search space, searching for a transformation policy based on an updated first search space, and transforming the new start point network according to the found transformation policy.

Therefore, in an embodiment of the application, if the serial network does not meet the preset condition, the serial network may be used as the new start point network, and the new start point network is re-transformed until a serial network that meets the preset condition or the termination condition is selected. Therefore, this embodiment of this disclosure is applicable to a plurality of different scenarios, and a proper serial network is selected for a target task. This embodiment of this disclosure has a strong generalization capability.

In an embodiment, the update condition may include but is not limited to: a quantity of times of transformation performed on the start point network does not exceed a preset quantity of times, or the first evaluation result does not meet a preset convergence condition. The convergence condition includes but is not limited to one or more of the following: the first evaluation result is better than a threshold, or a difference between the first evaluation result and an evaluation result obtained in previous evaluation of the start point network is less than a preset value.

Therefore, in an embodiment of the disclosure, if the quantity of times of transformation performed on the start point network does not exceed the preset quantity of times, or the first evaluation result does not meet the preset convergence condition, the start point network may continue to be transformed until the start point network that does not meet the update condition is obtained.

In an embodiment, the preset condition may include but is not limited to: a second evaluation result of the serial network meets a first preset evaluation condition, a quantity of times of transformation performed on the serial network exceeds a preset quantity of times of transformation, or duration from last time of transformation performed on the start point network exceeds a preset value, where the second evaluation result is obtained by evaluating the serial network.

Therefore, in an embodiment of the disclosure, when the evaluation result of the serial network meets the first preset evaluation condition, the quantity of times of transformation performed on the serial network exceeds the preset quantity of times of transformation, or the duration from last time of transformation performed on the start point network exceeds the preset value, the serial network may be trained to obtain the trained serial network. Generally, an output result of the trained serial network is more accurate.

In an embodiment, the first preset evaluation condition may include but is not limited to: a loss value of the serial network is not greater than a first loss threshold, a precision value of the output result is greater than a first precision threshold, inference duration is less than a first inference threshold, or the like.

In an embodiment, each serial subnet in the start point network includes one or more blocks. Transforming the start point network may include: swapping blocks included in two adjacent serial subnets in the plurality of serial subnets;

or inserting a processed block into one or more of the plurality of serial subnets, where the processed block may be obtained by initializing a weight of a block as identity matrix and/or performing group normalization on the block.

In an embodiment of the disclosure, the start point network may be transformed by swapping or transferring the blocks included in the adjacent serial subnets in the serial subnets, or adding a block to the serial subnet, to obtain a transformed start point network.

In an embodiment, the termination condition may include but is not limited to: the second evaluation result of the serial network meets a second preset evaluation condition, or a quantity of times of training of the serial network exceeds a preset quantity of times of training.

In an embodiment of the disclosure, when the evaluation result of the serial network meets the second preset evaluation condition, or the quantity of times of training of the serial network exceeds the preset quantity of times of training, transformation of the serial network may be terminated, and the target neural network for executing the target task is constructed based on the serial network.

In an embodiment, the second preset evaluation condition may include: the loss value of the serial network is not greater than a second loss threshold, the precision value of the output result is greater than a second precision threshold, or the inference duration is less than a second inference threshold.

In an embodiment, the obtaining a target neural network based on the trained serial network may include: if the trained serial network meets an output condition, using the trained serial network as the target neural network; or if the trained serial network does not meet the output condition, obtaining a parallel subnet corresponding to the trained serial network, and constructing the target neural network based on the trained serial network and the parallel subnet corresponding to the trained serial network.

In an embodiment of the disclosure, if the trained serial network meets the output condition, the trained serial network may be used as the target neural network, to efficiently and accurately obtain the target neural network. If the trained serial network meets the termination condition but does not meet the output condition, the parallel subnet corresponding to the trained serial network may be obtained, and the target neural network is constructed based on the trained serial network and the parallel subnet corresponding to the trained serial network. It may be understood that the parallel subnet corresponding to the trained serial network may be obtained, and the target neural network is constructed based on the trained serial network and the parallel subnet, to improve accuracy of the output result of the obtained target neural network. In this way, the neural network constructed based on the trained serial network and the parallel subnet can meet the output condition, and a target neural network with a more accurate output result can be obtained.

In an embodiment, the serial network may include a plurality of serial subnets, and each serial subnet includes one or more blocks. The obtaining a parallel subnet corresponding to the trained serial network may include: determining, within a preset quantity range, a quantity of parallel subnets corresponding to each serial subnet in the plurality of serial subnets; and constructing, based on the quantity of parallel subnets corresponding to each serial subnet, the parallel subnet corresponding to each serial subnet.

Therefore, in an embodiment of the disclosure, the quantity of parallel subnets corresponding to each serial subnet may be searched for within the preset quantity range, and then the parallel subnet corresponding to each serial subnet is constructed based on the quantity, so that the target neural network with the more accurate output result can be constructed.

In a possible implementation, the constructing the target neural network based on the serial network and the parallel subnet corresponding to each serial subnet may include: constructing a temporary neural network based on the serial network and the parallel subnet corresponding to each serial subnet; evaluating the temporary neural network to obtain a third evaluation result; and if the third evaluation result meets the output condition, using the temporary neural network as the target neural network; or if the third evaluation result does not meet the output condition, re-obtaining a parallel subnet corresponding to the serial network.

Therefore, in an embodiment of the disclosure, the target neural network that meets the output condition may be constructed based on the serial network and the corresponding parallel subnet, so that the target neural network can be accurately and efficiently obtained. The target neural network can be applied to different scenarios and has a strong generalization capability.

In an embodiment, the output condition includes one or more of the following: precision is greater than a first threshold; average precision is greater than a second threshold; the loss value is not greater than a third threshold; or the inference duration is not greater than a fourth threshold, and floating-point operations per second is not greater than a fifth threshold. The average precision is an average value of a plurality of precisions obtained by evaluating a neural network for a plurality of times, and the inference duration is duration for obtaining an output result from the neural network based on an input. Generally, the output condition may be determined based on the target task. For example, the output condition may be obtained from data input by a user, to obtain the target neural network that can be applied to different scenarios, thereby improving user experience.

In an embodiment, types of parameters included in the first search space include: the width, the depth, a quantity of times of downsampling, and a location of downsampling. The width includes a quantity of input channels and a quantity of output channels of a block included in each serial subnet in the start point network, the depth is a quantity of blocks included in each serial subnet in the start point network, and downsampling is used to divide two adjacent serial subnets in the start point network. Therefore, in an embodiment of the disclosure, a parameter such as the width, the depth, the quantity of times of downsampling, or the location of downsampling may be obtained through sampling in the first search space, so that the serial network is transformed based on the found parameter. A plurality of different transformation manners are provided, thereby enriching transformation networks for transforming the serial network, and accurately obtaining a serial network that meets a condition.

In an embodiment, the target neural network is used to perform at least one of image recognition, semantic segmentation, or object detection, and the preset dataset includes an ImageNet dataset. Therefore, in an embodiment of the disclosure, the serial network may be trained by using the ImageNet dataset, to obtain a serial network with a more accurate output result.

In an embodiment, a manner of obtaining the start point network may include: obtaining the target task by using the data input by the user, and then obtaining the start point network based on the target task. The constructed target neural network may be used to execute the target task.

According to a second aspect, this disclosure provides a neural network construction apparatus, including:

an obtaining module, configured to obtain a start point network, where the start point network includes a plurality of serial subnets;

a transformation module, configured to perform at least one time of transformation on the start point network based on a preset first search space to obtain a serial network, where the first search space includes a range of parameters used for transforming the start point network;

a training module, configured to: if the serial network meets a preset condition, train the serial network by using a preset dataset to obtain a trained serial network; and a construction module, configured to: if the trained serial network meets a termination condition, obtain a target neural network based on the trained serial network.

For beneficial effects generated by any one of the second aspect and the possible implementations of the second aspect, refer to the descriptions of any one of the first aspect and the possible implementations of the first aspect.

In an embodiment, the transformation module may be configured to: search the preset first search space for a transformation policy, where the transformation policy includes a group of parameters used for transforming the start point network; transform the start point network according to the transformation policy to obtain a transformed start point network, where a weight of the transformed start point network is obtained by inheriting a weight of the start point network before transformation; update the weight of the transformed start point network by using a lightweight dataset, to obtain a start point network with an updated weight, where data included in the preset dataset is more than data included in the lightweight dataset; evaluate the start point network with the updated weight to obtain a first evaluation result; and if the first evaluation result meets a preset update condition, re-search the first search space for a transformation policy, and re-transform the start point network according to the re-found transformation policy; or if the first evaluation result does not meet the preset update condition, use the start point network with the updated weight as the serial network.

In an embodiment, the neural network construction apparatus may further include:

an update module, configured to: if the serial network does not meet the preset condition, use the serial network as a new start point network; or if the trained serial network does not meet the termination condition, use the trained serial network as a new start point network; and update the first search space; and the transformation module is further configured to: re-search for a transformation policy based on an updated first search space, and re-transform the new start point network according to the re-found transformation policy.

In an embodiment, the update condition includes: a quantity of times of transformation performed on the start point network does not exceed a preset quantity of times, or the first evaluation result does not meet a preset convergence condition. The convergence condition includes one or more of the following: the first evaluation result is better than a threshold, or a difference between the first evaluation result and an evaluation result obtained in previous evaluation of the start point network is less than a preset value.

In an embodiment, the preset condition may include but is not limited to: a second evaluation result of the serial network meets a first preset evaluation condition, a quantity of times of transformation performed on the serial network exceeds a preset quantity of times of transformation, or duration from last time of transformation performed on the start point network exceeds a preset value, where the second evaluation result is obtained by evaluating the serial network. The first preset evaluation condition includes one or more of the following: a loss value of the serial network is not greater than a first loss threshold, a precision value of an output result of the serial network is greater than a first precision threshold, or inference duration of the serial network is less than a first inference threshold.

In an embodiment, the start point network includes a plurality of serial subnets, each serial subnet includes one or more blocks, and the transformation module may be configured to: swap blocks included in two adjacent serial subnets in the plurality of serial subnets; or insert a processed block into one or more of the plurality of serial subnets, where the inserted processed block is obtained by initializing a weight of a block as an identity matrix and/or performing group normalization on the block.

In an embodiment, the termination condition may include but is not limited to: the second evaluation result of the serial network meets a second preset evaluation condition, or a quantity of times of training of the serial network exceeds a preset quantity of times of training.

In an embodiment, the construction module may be configured to: if the trained serial network meets an output condition, use the trained serial network as the target neural network; or if the trained serial network does not meet the output condition, obtain a parallel subnet corresponding to the trained serial network, and construct the target neural network based on the trained serial network and the parallel subnet corresponding to the trained serial network.

In an embodiment, the serial network includes a plurality of serial subnets, and each serial subnet includes one or more blocks. The construction module may be configured to: determine, within a preset quantity range, a quantity of parallel subnets corresponding to each serial subnet in the plurality of serial subnets; and construct, based on the quantity of parallel subnets corresponding to each serial subnet, the parallel subnet corresponding to each serial subnet, where a structure of each serial subnet is the same as a structure of the parallel subnet corresponding to each serial subnet.

In an embodiment, the construction module may be configured to: construct a temporary neural network based on the serial network and the parallel subnet corresponding to each serial subnet; evaluate the temporary neural network to obtain a third evaluation result; and if the third evaluation result meets the output condition, use the temporary neural network as the target neural network; or if the third evaluation result does not meet the output condition, re-obtain a parallel subnet corresponding to the serial network.

In an embodiment, the output condition includes but is not limited to one or more of the following: precision is greater than a first threshold; average precision is greater than a second threshold; the loss value is not greater than a third threshold; or the inference duration is not greater than a fourth threshold, and floating-point operations per second is not greater than a fifth threshold. The average precision is an average value of a plurality of precisions obtained by evaluating a neural network for a plurality of times, and the inference duration is duration for obtaining an output result from the neural network based on an input.

In an embodiment, types of parameters included in the first search space may include but are not limited to a width, a depth, a quantity of times of downsampling, and a location of downsampling. The width includes a quantity of input channels and a quantity of output channels of a block included in each serial subnet in the start point network, the depth is a quantity of blocks included in each serial subnet in the start point network, and downsampling is used to divide two adjacent serial subnets in the start point network.

In an embodiment, the target neural network is used to perform at least one of image recognition, semantic segmentation, or object detection, and the preset dataset includes an ImageNet dataset.

In an embodiment, a manner of obtaining the start point network may include: obtaining a target task by using data input by a user, and then obtaining the start point network based on the target task. The constructed target neural network may be used to execute the target task.

According to a third aspect, an embodiment of this disclosure provides a neural network construction apparatus, including a processor and a memory. The processor and the memory are interconnected through a line, and the processor invokes program code in the memory to perform a processing-related function in the neural network construction method in any one of the first aspect. In an embodiment, the neural network construction apparatus may be a chip.

According to a fourth aspect, an embodiment of this disclosure provides a neural network construction apparatus. The neural network construction apparatus may also be referred to as a digital processing chip or a chip. The chip includes a processing unit and a communication interface. The processing unit obtains program instructions through the communication interface, and when the program instructions are executed by the processing unit, the processing unit is configured to perform a processing-related function in any one of the first aspect or the optional implementations of the first aspect.

According to a fifth aspect, an embodiment of this disclosure provides a computer-readable storage medium including instructions. When the instructions are run on a computer, the computer is enabled to perform the method in any one of the first aspect or the optional implementations of the first aspect.

According to a sixth aspect, an embodiment of this disclosure provides a computer program product including instructions. When the computer program product runs on a computer, the computer is enabled to perform the method in any one of the first aspect or the optional implementations of the first aspect.

BRIEF DESCRIPTION OF DRAWINGS

FIG. 10A and FIG. 10B are a schematic flowchart of another neural network construction method according to an embodiment of this disclosure;

DESCRIPTION OF EMBODIMENTS

The following describes technical solutions in embodiments of this disclosure with reference to accompanying drawings in embodiments of this disclosure. It is clear that the described embodiments are merely a part rather than all of embodiments of this disclosure. All other embodiments obtained by one of ordinary skilled in the art based on embodiments of this disclosure without creative efforts shall fall within the protection scope of this disclosure.

A neural network construction method provided in this disclosure may be applied to an artificial intelligence (AI) scenario. AI is a theory, a method, a technology, or an application system that simulates, extends, and expands human intelligence by using a digital computer or a machine controlled by a digital computer, to perceive an environment, obtain knowledge, and achieve an optimal result by using the knowledge. In other words, the artificial intelligence is a branch of computer science, and is intended to understand the essence of intelligence and produce a new intelligent machine that can react in a manner similar to human intelligence. The artificial intelligence is to study design principles and implementation methods of various intelligent machines, so that the machines have perception, inference, and decision-making functions. Researches in the field of artificial intelligence include robotics, natural language processing, computer vision, decision-making and inference, human-computer interaction, recommendation and search, an AI basic theory, and the like.

Figure 1:
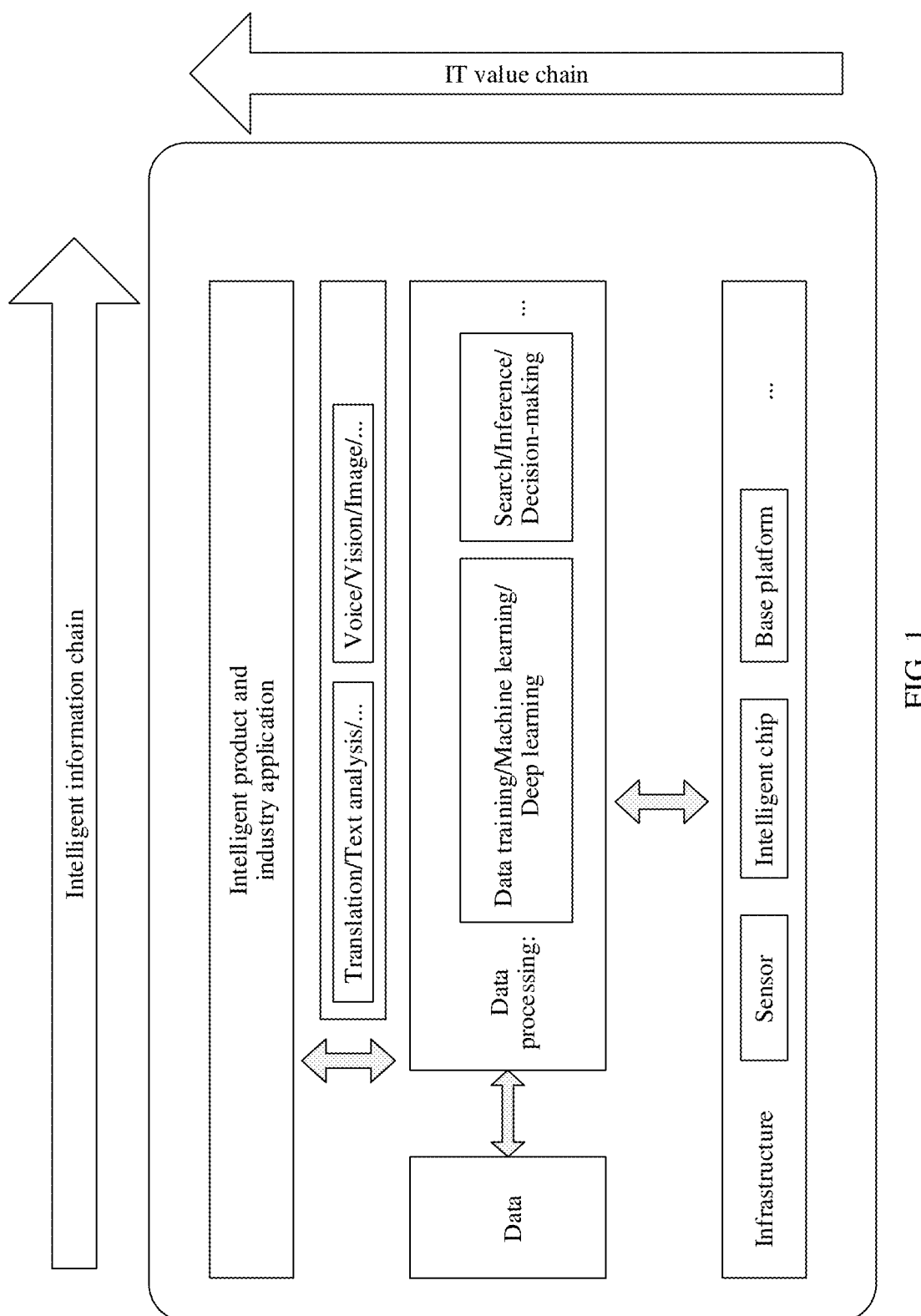
FIG. 1 is a schematic diagram of an artificial intelligence main framework applied to this disclosure.

FIG. 1 is a schematic diagram of an artificial intelligence main framework. The main framework describes an overall working procedure of an artificial intelligence system, and is applicable to a requirement of a general artificial intelligence field.

The following describes the artificial intelligence main framework from two dimensions: an "intelligent information chain" (a horizontal axis) and an "IT value chain" (a vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, data undergoes a condensation process of "data-information-knowledge-wisdom".

The "IT value chain" reflects a value brought by artificial intelligence to the information technology industry in a process from an underlying infrastructure and information (providing and processing technology implementation) of human intelligence to a systemic industrial ecology.

(1) Infrastructure

The infrastructure provides computing capability support for the artificial intelligence system, implements communication with the external world, and implements support by using a base platform. The infrastructure communicates with the outside by using a sensor. A computing capability is provided by an intelligent chip, for example, a hardware acceleration chip such as a central processing unit (CPU), a neural-network processing unit (NPU), a graphics processing unit (GPU), an application-specific integrated circuit (ASIC), or a field programmable gate array (FPGA). The base platform includes related platform assurance and support such as a distributed computing framework and a network, and may include cloud storage and computing, an interconnection and interworking network, and the like. For example, the sensor communicates with the outside to obtain data, and the data is provided to an intelligent chip in a distributed computing system for computation, where the distributed computing system is provided by the base platform.

(2) Data

Data at an upper layer of the infrastructure indicates a data source in the field of artificial intelligence. The data relates to a graph, an image, a voice, a video, and text, further relates to internet of things data of a conventional device, and includes service data of an existing system and perception data such as force, displacement, a liquid level, a temperature, and humidity.

(3) Data Processing

Data processing usually includes manners such as data training, machine learning, deep learning, searching, inference, and decision-making.

Machine learning and deep learning may mean performing symbolized and formalized intelligent information modeling, extraction, preprocessing, training, and the like on data.

Inference is a process in which a pattern of human intelligent inference is simulated in a computer or an intelligent system, and machine thinking and problem resolving are performed by using formalized information according to an inferring control policy. A typical function is searching and matching.

Decision-making is a process in which a decision is made after intelligent information is inferred, and usually provides functions such as classification, ranking, and prediction.

(4) General Capabilities

After data processing mentioned above is performed on data, some general capabilities may be further formed based on a data processing result, for example, an algorithm or a general system, such as translation, text analysis, computer vision processing (such as image recognition and object detection), and speech recognition.

(5) Intelligent Product and Industry Application

The intelligent product and the industry application are a product and an application of the artificial intelligence system in various fields, and are package of an overall solution of the artificial intelligence, so that decision-making for intelligent information is productized and an application is implemented. Application fields mainly include smart manufacturing, smart transportation, smart home, smart health care, smart security protection, autonomous driving, a safe city, a smart terminal, and the like.

Figure 2:
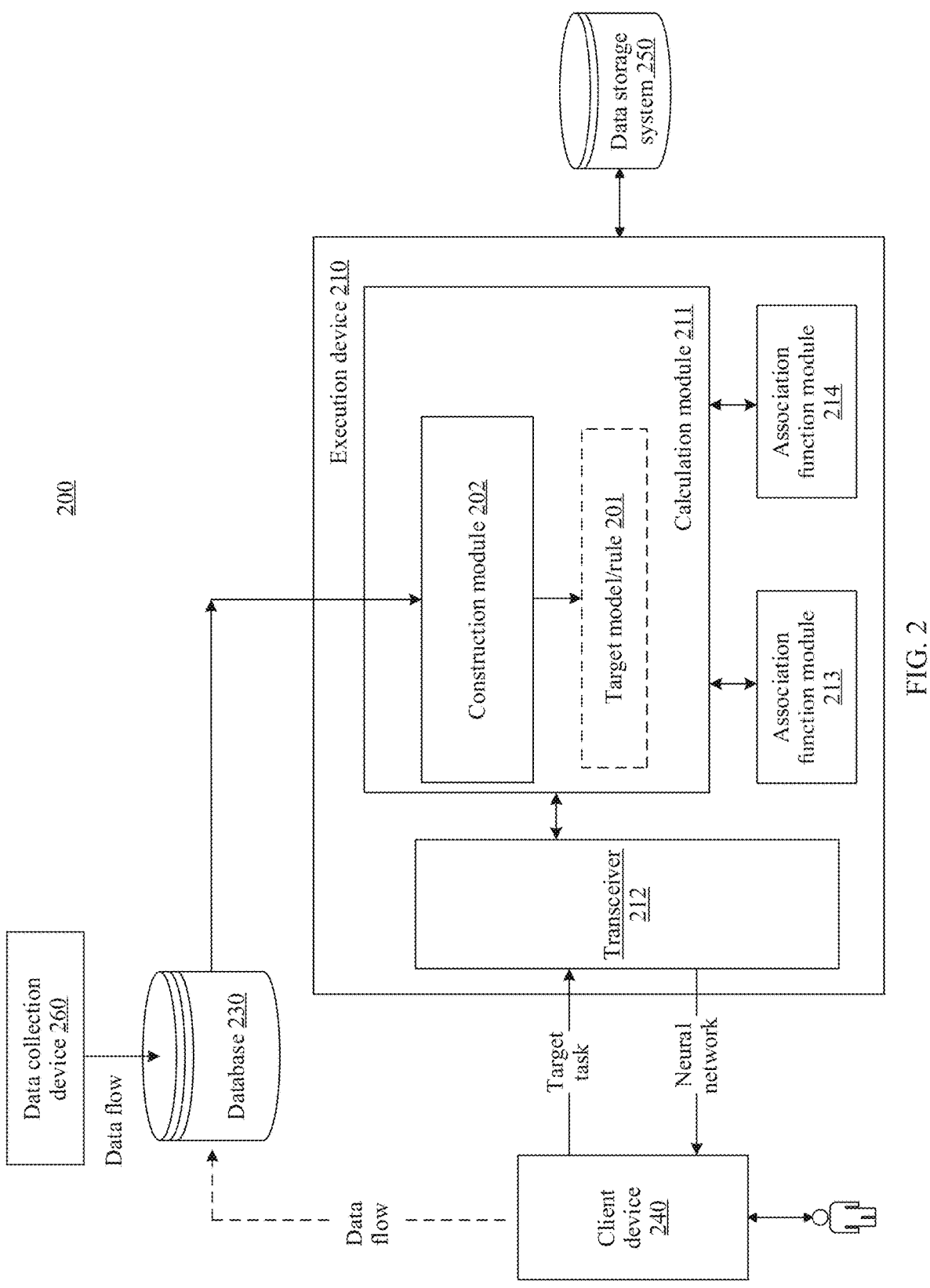
FIG. 2 is a schematic diagram of a system architecture according to an embodiment of the disclosure.

Refer to FIG. 2. An embodiment of this disclosure provides a system architecture 200. The system architecture includes a database 230 and a client device 240. A data collection device 260 is configured to collect data and store the data in the database 230. A construction module 202 generates a target model/rule 201 based on the data maintained in the database 230. The following describes in more detail how the construction module 202 obtains the target model/rule 201 based on the data. The target model/rule 201 is a neural network constructed in the following implementations of this disclosure. For details, refer to related descriptions in FIG. 6 to FIG. 13.

A calculation module may include the construction module 202, and the target model/rule obtained by the construction module 202 may be applied to different systems or devices. In FIG. 2, a transceiver 212 is configured for an execution device 210. The transceiver 212 may be a wireless transceiver, an optical transceiver, a wired interface (such as an I/O interface), or the like, and swaps data with an external device. A "user" may input data to the transceiver 212 by using the client device 240. For example, in the following implementations of this disclosure, the client device 240 may send a target task to the execution device 210, request the execution device to construct the neural network, and send a database used for training to the execution device 210.

The execution device 210 may invoke data, code, and the like in a data storage system 250, or may store data, instructions, and the like in a data storage system 250.

The calculation module 211 processes input data by using the target model/rule 201. For example, the calculation module 211 is configured to: obtain a start point network based on the target task; perform at least one time of transformation on the start point network based on a preset first search space, to obtain a serial network, where the first search space includes parameters used for transforming the start point network; if the serial network meets a preset condition, train the serial network by using a preset dataset to obtain a trained serial network; and if the trained serial network meets a termination condition, obtain a target neural network based on the trained serial network, where the target neural network is used to execute the target task. It may be understood that the calculation module 211 may be configured to construct a backbone network of the neural network.

An association function module 213 and an association function module 214 may be configured to search for another network associated with the target task other than the backbone network, for example, a region proposal network (RPN) or a feature pyramid network (FPN).

Finally, the transceiver 212 returns the constructed neural network to the client device 240, to deploy the neural network in the client device 240 or another device.

More deeply, the construction module 202 may obtain corresponding target models/rules 201 based on different data for different target tasks, to provide a better result for the user.

In a case shown in FIG. 2, the data input to the execution device 210 may be determined based on input data of the user. For example, the user may perform an operation in an interface provided by the transceiver 212. In another case, the client device 240 may automatically input data to the transceiver 212 and obtain a result. If the client device 240 needs to obtain permission of the user for automatically inputting the data, the user may set corresponding permission on the client device 240. The user may view, on the client device 240, a result output by the execution device 210, and a presentation form may be a manner, for example, display, a sound, or an action. The client device 240 may also be used as a data collection end to store collected data associated with the target task in the database 230.

It should be noted that FIG. 2 is merely an example of the schematic diagram of the system architecture according to an embodiment of the disclosure. Location relationships between devices, components, modules, and the like shown in the figure constitute no limitation. For example, in FIG. 2, the data storage system 250 is an external memory relative to the execution device 210. In another scenario, the data storage system 250 may alternatively be disposed in the execution device 210.

A training or update process in this disclosure may be performed by the construction module 202. It may be understood that a training process of the neural network is a manner of learning and controlling spatial transformation, and more specifically, learning a weight matrix. An objective of training the neural network is to make an output of the neural network close to an expected value as much as possible. Therefore, a weight vector of each layer of neural network in the neural network may be updated based on a difference between a predicted value and an expected value of a current network (certainly, before first update, the weight vector may be initialized first, in other words, a parameter is pre-configured for each layer in the deep neural network). For example, if the predicted value of the network is high, a value of a weight in the weight matrix is adjusted to reduce the predicted value. After continuous adjustment, a value output by the neural network is close to the expected value or equal to the expected value. For example, the difference between the predicted value and the expected value of the neural network may be measured by using a loss function or an objective function. The loss function is used as an example. A higher output value (loss) of the loss function indicates a larger difference, and training of the neural network may be understood as a process of reducing a loss as much as possible. For a process of updating a weight of the start point network and training the serial network in the following implementations of this disclosure, refer to this process. Details are not described below again.

The neural network in this disclosure may include a plurality of types, for example, a deep neural network (DNN), a convolutional neural network (CNN), a recurrent neural network (RNN), a highway network or a residual network, and other neural networks.

For example, the following uses the convolutional neural network (CNN) as an example.

The CNN is a deep neural network with a convolutional structure. The CNN is a deep learning architecture, and the deep learning architecture refers to performing multi-layer learning at different abstract levels by using machine learning algorithms. As the deep learning architecture, the CNN is a feed-forward artificial neural network. Neurons in the feed-forward artificial neural network respond to an overlapping region in an image input to the CNN. The convolutional neural network includes a feature extractor including a convolution layer and a sub-sampling layer. The feature extractor may be considered as a filter. A convolution process may be considered as performing convolution by using a trainable filter and an input image or a convolution feature map. The convolutional layer is a neuron layer that is in the convolutional neural network and at which convolution processing is performed on an input signal. At the convolutional layer of the convolutional neural network, one neuron may be connected to only a part of neurons at a neighboring layer. A convolutional layer usually includes several feature maps, and each feature map may include some neurons arranged in a rectangle. Neurons of a same feature map share a weight, and the shared weight herein is a convolution kernel. Weight sharing may be understood as that an image information extraction manner is irrelevant to a location. A principle implied herein is that statistical information of a part of an image is the same as that of other parts. This means that image information learned in a part can also be used in another part. Therefore, image information obtained through same learning can be used for all locations in the image. At a same convolutional layer, a plurality of convolution kernels may be used to extract different image information. Usually, a larger quantity of convolution kernels indicates richer image information reflected by a convolution operation.

The convolution kernel may be initialized in a form of a random-size matrix. In a process of training the convolutional neural network, the convolution kernel may obtain an appropriate weight through learning. In addition, a direct benefit brought by weight sharing is that connections between layers of the convolutional neural network are reduced and an overfitting risk is lowered.

The convolutional neural network may correct a value of a parameter in an initial super-resolution model in a training process according to an error back propagation (BP) algorithm, so that an error loss of reconstructing the super-resolution model becomes smaller. For example, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

Figure 3:
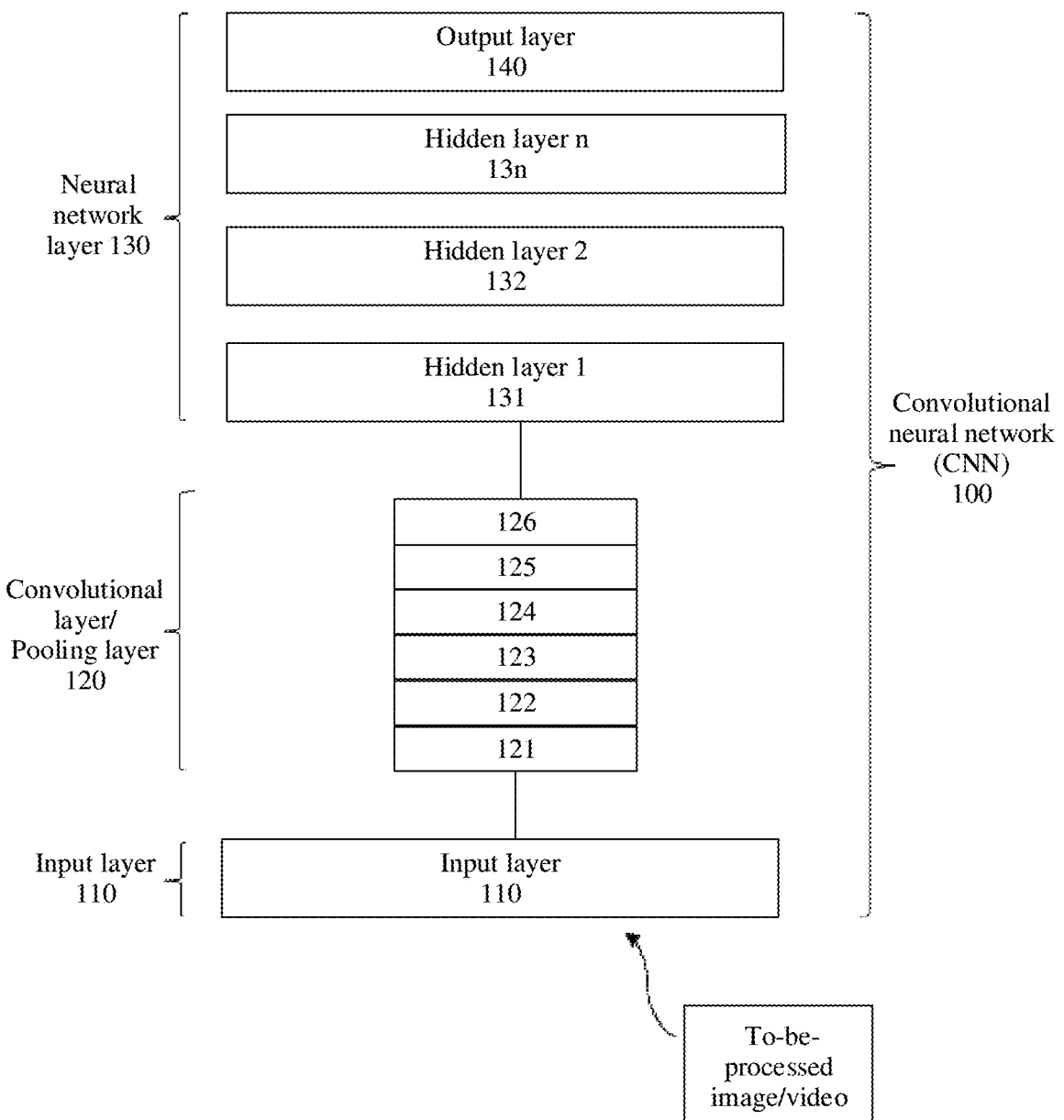
FIG. 3 is a schematic diagram of a structure of a convolutional neural network according to an embodiment of this disclosure.

As shown in FIG. 3, a convolutional neural network (CNN) 100 may include an input layer 110, a convolutional layer/pooling layer 120, and a neural network layer 130. The pooling layer is optional.

As shown in FIG. 3, for example, the convolutional layer/pooling layer 120 may include layers 121 to 126. In an embodiment, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another embodiment, the layer 121 and the layer 122 are convolutional layers, the layer 123 is a pooling layer, the layer 124 and the layer 125 are convolutional layers, and the layer 126 is a pooling layer. In an embodiment, an output of a convolutional layer may be used as an input of a subsequent pooling layer, or may be used as an input of another convolutional layer to continue to perform a convolution operation.

The convolutional layer 121 is used as an example. The convolutional layer 121 may include a plurality of convolution operators. The convolution operator is also referred to as a kernel. In image processing, the convolution operator functions as a filter that extracts information from an input image matrix. The convolution operator may be a weight matrix essentially, and the weight matrix is usually predefined. In a process of performing a convolution operation on an image, the weight matrix usually processes pixels at a granularity level of one pixel (or two pixels, depending on a value of a stride) in a horizontal direction on an input image, to extract a feature from the image. A size of the weight matrix is related to a size of the image. It should be noted that a depth dimension of the weight matrix is the same as a depth dimension of the input image. In a convolution operation process, the weight matrix extends to an entire depth of the input image. Therefore, a convolution output of a single depth dimension is generated by performing convolution with a single weight matrix. However, in most cases, a plurality of weight matrices of a same dimension rather than the single weight matrix are used. Outputs of the weight matrices are stacked to form a depth dimension of a convolutional image. Different weight matrices may be used to extract different features from the image. For example, one weight matrix is used to extract edge information of the image, another weight matrix is used to extract a color of the image, and a further weight matrix is used to blur unneeded noise in the image. The plurality of weight matrices have the same dimension, and feature maps extracted from the plurality of weight matrices with the same dimension have a same dimension. Then, the plurality of extracted feature maps with the same dimension are combined to form an output of the convolution operation.

Weight values in the weight matrices need to be obtained through massive training in actual application. Each weight matrix formed by using the weight values obtained through training may be used to extract information from the input image, to enable the convolutional neural network 100 to perform correct prediction.

When the convolutional neural network 100 includes a plurality of convolutional layers, a larger quantity of general features are usually extracted at an initial convolutional layer (for example, the convolutional layer 121). The general features may be also referred to as low-level features. As a depth of the convolutional neural network 100 increases, a feature extracted at a more subsequent convolutional layer (for example, the convolutional layer 126) is more complex, for example, a high-level semantic feature. A feature with higher semantics is more applicable to a to-be-resolved problem.

Pooling Layer:

Because a quantity of training parameters usually needs to be reduced, the pooling layer usually needs to be periodically introduced after a convolutional layer. In an embodiment, for the layers 121 to 126 in the convolutional layer/pooling layer 120 shown in FIG. 3, one convolutional layer may be followed by one pooling layer, or a plurality of convolutional layers may be followed by one or more pooling layers. During image processing, the pooling layer is only used to reduce a space size of the image. The pooling layer may include an average pooling operator and/or a maximum pooling operator, to perform sampling on the input image to obtain an image with a small size. The average pooling operator may compute a pixel value in the image within a range, to generate an average value. The maximum pooling operator may be used to select a pixel with a maximum value within the range as a maximum pooling result. In addition, similar to a case in which a size of a weight matrix in the convolutional layer should be related to a size of the image, an operator in the pooling layer should be also related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Layer 130:

After processing is performed at the convolutional layer/pooling layer 120, the convolutional neural network 100 still cannot output required output information. As described above, at the convolutional layer/pooling layer 120, only a feature is extracted, and parameters resulting from an input image are reduced. However, to generate final output information (required class information or other related information), the convolutional neural network 100 needs to use the neural network layer 130 to generate an output of one required class or outputs of a group of required classes. Therefore, the neural network layer 130 may include a plurality of hidden layers (131 and 132 to 13*n* shown in FIG. 3) and an output layer 140. In this disclosure, the convolutional neural network is a serial network obtained by performing at least one time of transformation on a selected start point network, and then is obtained based on a trained serial network. The convolutional neural network may be used for image recognition, image classification, super-resolution image reconstruction, and the like.

The plurality of hidden layers in the neural network layer 130 are followed by the output layer 140, namely, the last layer of the entire convolutional neural network 100. The output layer 140 has a loss function similar to a categorical cross entropy, and the loss function is used to compute a prediction error. Once forward propagation (for example, propagation from the layers 110 to 140 in FIG. 3 is forward propagation) of the entire convolutional neural network 100 is completed, reverse propagation (for example, propagation from the layers 140 to 110 in FIG. 3 is reverse propagation) is started to update weights and deviations of the layers mentioned above, to reduce a loss of the convolutional neural network 100 and an error between a result output by the convolutional neural network 100 by using the output layer and an ideal result.

It should be noted that the convolutional neural network 100 shown in FIG. 3 is merely used as an example of a convolutional neural network. In application, the convolutional neural network may alternatively exist in a form of another network model, for example, a plurality of parallel convolutional layers/pooling layers shown in FIG. 4, and extracted features are all input to the entire neural network layer 130 for processing.

Figure 5:
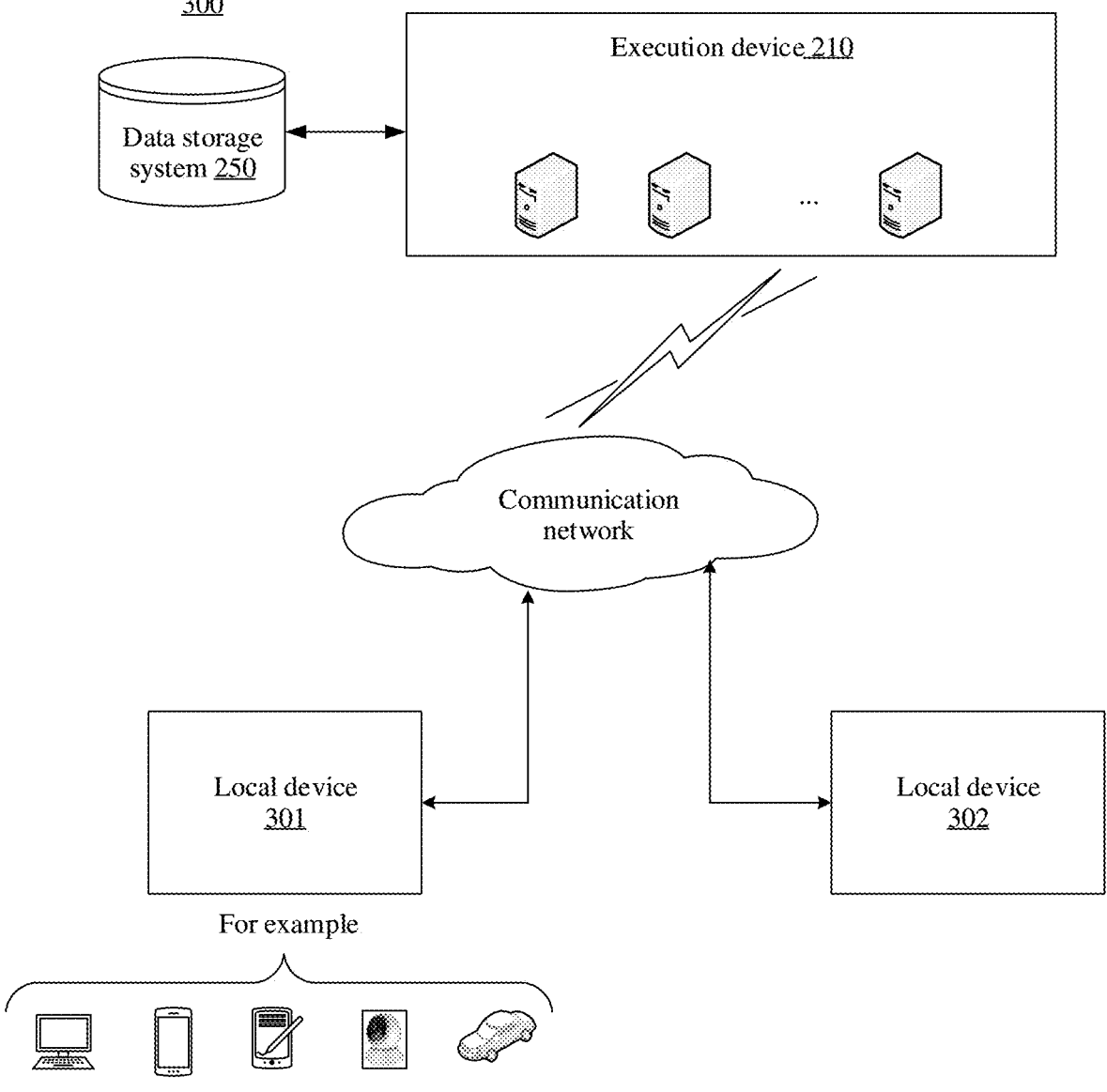
FIG. 5 is a schematic diagram of another system architecture according to an embodiment of the disclosure.

Refer to FIG. 5. An embodiment of this disclosure further provides a system architecture 300. An execution device 210 is implemented by one or more servers. In an embodiment, the execution device 210 cooperates with another computing device, for example, a device such as a data storage device, a router, or a load balancer. The execution device 210 may be disposed on one physical site, or distributed on a plurality of physical sites. The execution device 210 may implement the following operations of the neural network construction method corresponding to FIG. 6 to FIG. 13 in this disclosure by using data in a data storage system 250 or by invoking program code in a data storage system 250.

A user may operate respective user equipments (for example, a local device 301 and a local device 302) to interact with the execution device 210. Each local device may be any computing device, such as a personal computer, a computer workstation, a smartphone, a tablet computer, an intelligent camera, an intelligent vehicle, another type of cellular phone, a media consumption device, a wearable device, a set-top box, or a game console.

A local device of each user may interact with the execution device 210 through a communication network of any communication mechanism/communication standard. The communication network may be a wide area network, a local area network, a point-to-point connection, or any combination thereof. In an embodiment, the communication network may include a wireless network, a wired network, a combination of a wireless network and a wired network, or the like. The wireless network includes but is not limited to any one or any combination of a 5th generation (5G) mobile communication technology system, a long term evolution (LTE) system, a global system for mobile communication (global system for mobile communication, GSM), a code division multiple access (CDMA) network, a wideband code division multiple access (WCDMA) network, wireless fidelity (Wi-Fi), Bluetooth, ZigBee, a radio frequency identification (RFID) technology, long range Lora) wireless communication, and near field communication (NFC). The wired network may include an optical fiber communication network, a network formed by coaxial cables, or the like.

In another embodiment, one or more aspects of the execution device 210 may be implemented by each local device. For example, the local device 301 may provide local data for the execution device 210 or feed back a computation result.

It should be noted that all functions of the execution device 210 may also be implemented by the local device. For example, the local device 301 implements a function of the execution device 210 and provides a service for a user of the local device 301, or provides a service for a user of the local device 302.

Based on the system architecture or the neural network provided in FIG. 1 to FIG. 5, the following describes in detail the neural network construction method provided in this disclosure.

First, for ease of understanding, some terms in this disclosure are explained.

Automatic machine learning (AutoML): A series of advanced control systems are designed to operate machine learning models, so that the models can automatically learn proper parameters and configurations without manual intervention. In a learning model based on a deep neural network, automatic computational learning mainly includes network architecture search and global parameter setting. The network architecture search is used to enable, based on data, a computer to generate a neural network architecture that is most suitable for a problem, and has characteristics of high training complexity and great performance improvement.

A residual network is a convolutional neural network. In image recognition, recognition accuracy is higher than that of a conventional convolutional neural network. In a residual network design, there are many sub-modules with a same structure. Generally, ResNet is used to connect a number to indicate a quantity of times that a sub-module is repeated. For example, ResNet50 indicates that there are 50 sub-modules.

A backbone network is a network structure used to perform feature extraction on input information in a detector, splitter, classifier, or the like. Generally, in addition to the backbone network, the neural network may further include another functional network, for example, a region proposal network (RPN) or a feature pyramid network (FPN), to further process a feature extracted by the backbone network, for example, classify a recognized feature or perform semantic segmentation on the feature.

Block: Generally, the block includes a convolutional layer, or one block may be understood as a convolution module.

Figure 6:
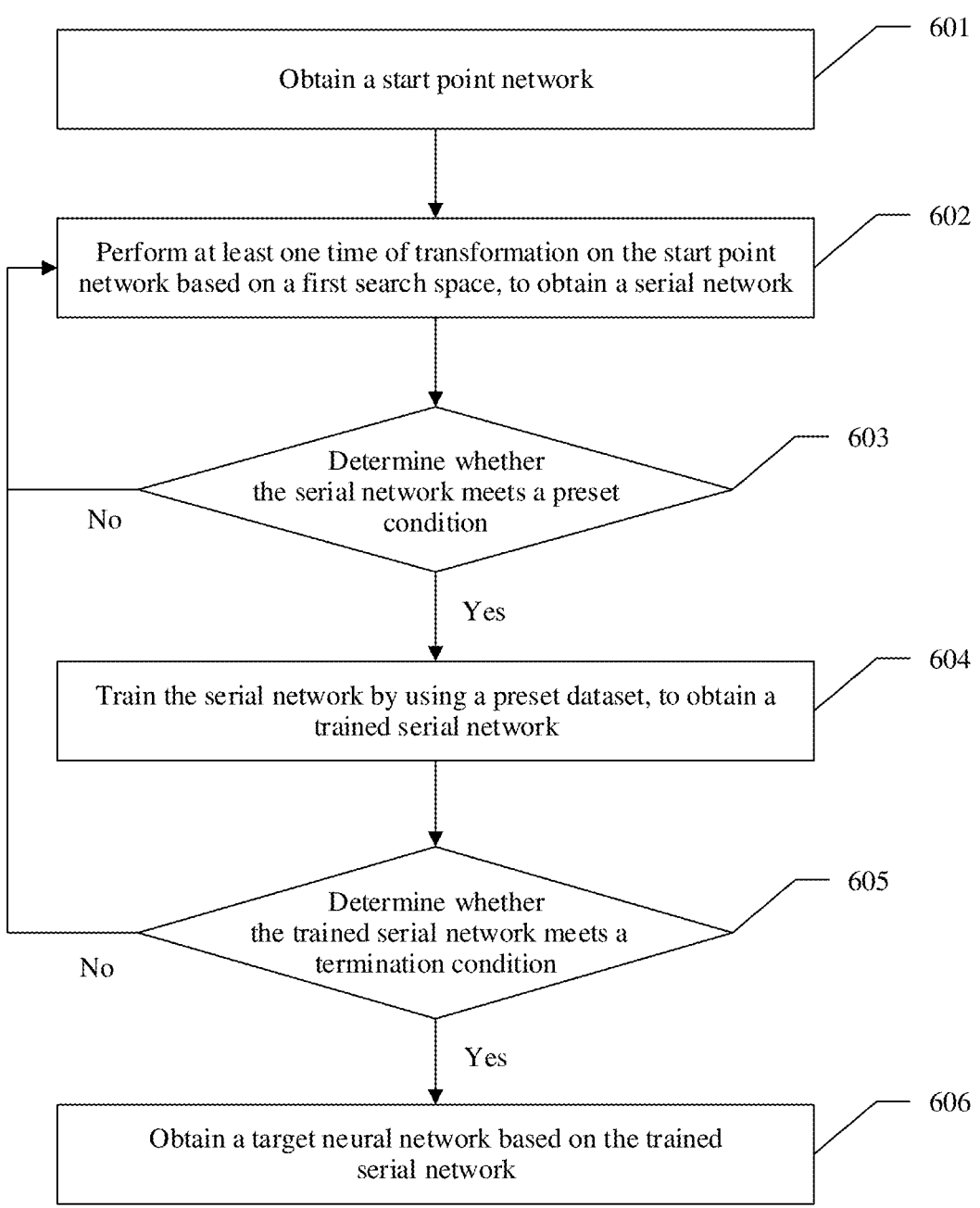
FIG. 6 is a schematic flowchart of a neural network construction method according to an embodiment of this disclosure.

FIG. 6 is a schematic flowchart of a neural network construction method an embodiment of the disclosure. The method includes the following operations.

601: Obtain a start point network.

The start point network may include a plurality of serial subnets, the plurality of serial subnets are connected in a serial manner, and each serial subnet includes one or more blocks.

In an embodiment, the start point network may be a backbone network commonly used in a classification, segmentation, or detection task, for example, a classification network, segmentation network, or detection network that does not carry a prediction header, which may be adjusted based on an actual application scenario.

In an embodiment, the start point network may be selected based on a target task, and the target task is a task executed by a neural network that needs to be constructed. Certainly, the start point network may alternatively be a randomly selected network, which may be adjusted based on actual application. In this disclosure, the start point network is selected by using the target task, so that the selected start point network is close to a requirement of the target task. This can reduce a training process, and improve efficiency of obtaining a target neural network.

In an embodiment, before operation 601, the target task may be further obtained. The target task may be a task executed by the target neural network that needs to be constructed. If this application may be executed by the execution device 210, the target task may be a received task sent by another device (for example, the client device 240, the local device 301, or the local device 302), or may be a target task generated based on a requirement of the execution device 210.

In addition, information associated with the target task may be further obtained, for example, a dataset associated with the target task, and information such as precision, computational complexity, an inference speed, and inference duration that the target neural network executing the target task meets. In an embodiment, the start point network may be selected based on the information associated with the target task. For example, the start point network may be selected based on the information such as the precision, the computational complexity, the inference speed, and the inference duration that the target neural network meets, so that the start point network meets or approaches the precision, the computational complexity, the inference speed, the inference duration, and the like that the target neural network needs to meet. In an embodiment, for example, if the target task is to construct an image recognition neural network with average precision of 80%, when the start point network is selected, a classification network with average precision greater than 80% or close to 80% may be selected as the start point network. Therefore, in an embodiment of the disclosure, the start point network may be selected based on the requirement corresponding to the target task, and a start point network that can obtain a maximum benefit is selected under a limitation of a given computing resource. For example, the start point network is selected based on the precision, the computational complexity, video memory occupation, floating-point operations per second (FLOPS), CPU usage, the inference speed, the inference duration, and the like, to obtain an optimal start point network under a condition limitation, and further quickly obtain a serial network. This can reduce a training process of obtaining the target neural network, and improve efficiency of subsequently obtaining the target neural network.

In some possible scenarios, the target neural network may be used to perform one or more of image recognition, semantic segmentation, object detection, or the like. For example, the client device 240 may send the target task to the execution device 210. The target task may be an image recognition task with accuracy of 80%, a semantic segmentation task with accuracy of 95%, a target detection task with inference duration of 100 ms, or the like.

602: Perform at least one time of transformation on the start point network based on a first search space, to obtain the serial network.

After the start point network is selected, or the serial network does not meet a preset condition, or a trained serial network does not meet a termination condition, the at least one time of transformation may be performed on the start point network based on the first search space, and a transformed start point network is used as the serial network. The first search space includes a range of parameters used for transforming the start point network, for example, a value range of a depth or a value range of a width.

The transformation in this operation may be performing the at least one time of transformation on the start point network based on the first search space after the start point network is selected; or may be using the serial network that does not meet the preset condition or the trained serial network that does not meet the termination condition as a new start point network after it is determined that the serial network does not meet the preset condition (refer to the following operation 603) or the trained serial network does not meet the termination condition (refer to the following operation 605), and transforming the new start point network after the first search space is updated. It may be understood that, after it is determined that the serial network does not meet the preset condition or the trained serial network does not meet the termination condition, the serial network or the trained serial network may be used as the new start point network for transformation, so as to re-obtain a serial network.

In an embodiment, a procedure of one of the at least one time of transformation performed on the start point network may include: searching the first search space for a transformation policy, namely, a group of parameters used for transforming the start point network, and transforming the start point network according to the transformation policy to obtain the transformed start point network, where a weight of the transformed start point network inherits a weight of the start point network before transformation; updating the weight of the transformed start point network by using a lightweight dataset, to obtain a start point network with an updated weight; evaluating the start point network with the updated weight to obtain a first evaluation result; determining whether the first evaluation result meets a preset update condition; and if the first evaluation result meets the update condition, re-searching the first search space for a transformation policy and re-transforming the start point network according to the re-found transformation policy. When the start point network is re-transformed, the first search space may be re-searched for the transformation policy, and the re-found transformation policy is usually different from a transformation policy used in a previous time of transformation.

It may be understood that, in this operation, the start point network may be transformed for a plurality of times, and the weight is updated until a start point network that does not meet the update condition is obtained. In this process, a plurality of start point networks with updated weights are obtained. If a quantity of times of updating the start point networks reaches a limit value, an optimal start point network may be determined from the plurality of start point networks with updated weights as a final serial network. For example, if the start point network is transformed for the plurality of times to obtain the plurality of start point networks with updated weights, and precision of output results of the plurality of start point networks with updated weights is 50%, 60%, and 80% respectively, the start point network with precision is 80% is used as the final serial network.

The following separately explains in more detail a transformation procedure of the start point network.

Data included in the lightweight dataset is used to update the weight of the transformed start point network. It may be understood that the transformed start point network may be quickly trained based on the data included in the lightweight dataset, to efficiently update the weight of the transformed start point network. In an embodiment, the lightweight dataset may be data collected by the data collection device 260, or may be data sent by the client device to the execution device 210. For example, the data included in the lightweight dataset may be some data in a local ImageNet dataset, or the data included in the lightweight dataset may be some data included in the database 230.

In an embodiment, the first evaluation result may include but is not limited to a loss value of the start point network, a precision value of an output result, inference duration, or the like. Correspondingly, a process of evaluating the start point network may include: calculating a value of a loss function of the start point network, calculating accuracy of the output result of the start point network, calculating inference duration from input to output of the start point network, or the like, to obtain the first evaluation result.

In an embodiment, the update condition may include but is not limited to one or more of the following: a quantity of times of transformation performed on the start point network does not exceed a preset quantity of times, or the first evaluation result does not meet a preset convergence condition. The preset convergence condition may be determined based on data included in the first evaluation result. In an embodiment, the data included in the first evaluation result may be better than a threshold, or a difference between the data included in the first evaluation result and an evaluation result obtained in previous evaluation of the start point network is less than a preset value. For example, if the first evaluation result includes the loss value of the start point network, the convergence condition may be that the loss value is less than 20, or a difference between the first evaluation result and a loss value obtained in previous evaluation of the start point network is less than 10. For another example, if the first evaluation result includes a precision value of classification for the start point network, the convergence condition may be that the precision value is greater than 80%, or the convergence condition may be that a difference between a precision value obtained in current evaluation and a precision value obtained in previous evaluation of the start point network is less than 5%.

The first search space includes the range of parameters used for transforming the start point network. The first search space may include information related to each feature stage in the start point network, for example, a value range such as a width, a depth, or a location of downsampling of one stage. A feature stage in the start point network may be understood as a serial subnet.

Generally, the start point network or the serial network may include a plurality of serial subnets, and each serial subnet may include one or more blocks. In an embodiment, the block included in the start point network may be classified into a basic block (BB), a bottle neck unit (BNB), a ResNeXt block, and the like.

In an embodiment, types of parameters included in the first search space may include a width, a depth, a quantity of times of downsampling, a location of downsampling, and the like. The width includes a quantity of input channels and a quantity of output channels of a block included in each serial subnet in the start point network, the depth is a quantity of blocks included in each serial subnet in the start point network, downsampling is used to divide two adjacent serial subnets in the start point network, the quantity of times of downsampling is used to determine a quantity of serial subnets in the start point network, and the location of downsampling is used to divide two adjacent serial subnets. Downsampling may be understood as follows: in a process in which each serial subnet of the start point network processes an image, the image may be processed after downsampling is performed on the image, to reduce an amount of data of the image that needs to be processed, thereby reducing a workload. Content included in the first search space includes, for example, a network depth: 8 to 60 blocks; a quantity of feature stages: 5 to 7 feature stages, namely, a quantity of serial subnets; and a network width that represents a quantity of input channels and a quantity of output channels of a basic block in a serial subnet, and further, may be represented as a location at which a channel size in the serial network is doubled.

Figures 7, 8:
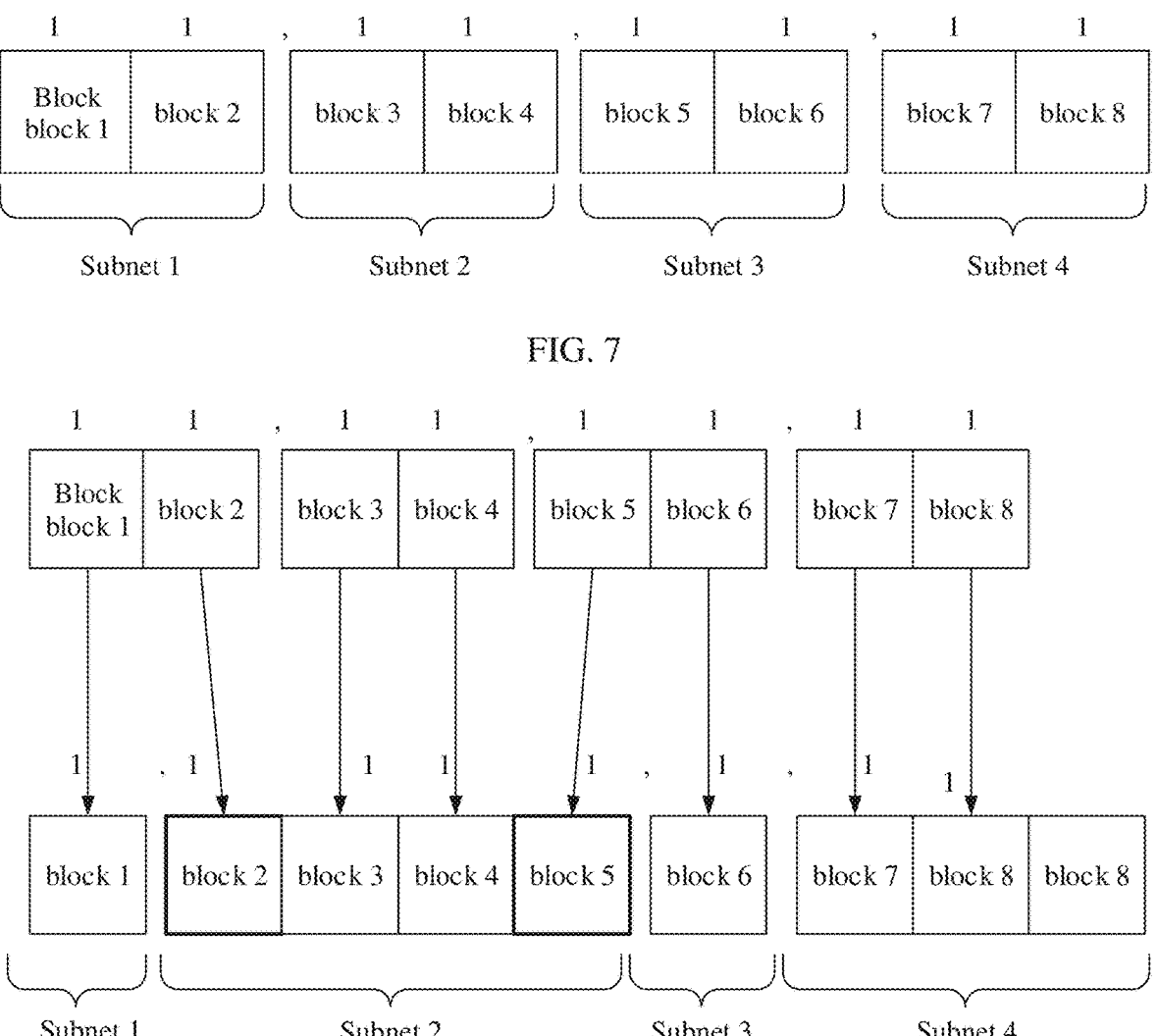
FIG. 7 is a schematic diagram of a network transformation manner according to an embodiment of this disclosure.
FIG. 8 is a schematic diagram of another network transformation manner according to an embodiment of this disclosure.

For example, as shown in FIG. 7, the start point network may include four serial subnets, namely, a serial subnet 1, a serial subnet 2, a serial subnet 3, and a serial subnet 4 that are shown in FIG. 7. "1" indicates that an output channel of a corresponding block is one time of an input channel. Certainly, "1" herein may alternatively be replaced with "2", "3", or the like, which may be adjusted based on an actual application scenario. "," indicates downsampling. For example, "," exists between a block 2 and a block 3, indicating that the block 2 and the block 3 are in different serial subnets. In an embodiment, in the process of processing the image, downsampling may be performed on the image, to reduce the amount of data of the image that needs to be processed, thereby reducing the workload. Currently, each serial subnet in the serial network may not perform downsampling on an image, in other words, amounts of data of images processed by all serial subnets are the same, thereby improving accuracy of a detection result. In an embodiment, whether to perform downsampling may be determined based on an actual application scenario. This is not limited in this disclosure.

Still further, a process of transforming the start point network may include: swapping blocks included in two adjacent serial subnets in the plurality of serial subnets, or may be understood as swapping locations of downsampling and blocks; or inserting a block into one or more of the plurality of serial subnets, where the inserted block is obtained by initializing a weight as an identity matrix and performing group normalization. For ease of understanding, a process of inserting the block into one or more of the plurality of serial subnets may be referred to as extension. That is, a transformation operation on the start point network may include swap or extension. For example, as shown in FIG. 8, a block 2 in a serial subnet 1 may be adjusted to a serial subnet 2, and a block 5 in a serial subnet 3 may be further adjusted to the serial subnet 2, that is, a location of downsampling "," is adjusted, so that the block 2 in the serial subnet 1 is adjusted to the serial subnet 2 and the block 5 in the serial subnet 3 is adjusted to the serial subnet 2. In addition, a block 8 may be further extended in a serial subnet 4.

Correspondingly, a manner of transforming the start point network may include: searching the first search space for a transformation policy for transforming the start point network, where the transformation policy includes parameters used for transforming the start point network, for example, a width, a depth, a location of downsampling in the start point network, or a quantity of times of downsampling of each serial subnet in the start point network. Then, the width, the depth, the location of downsampling, the quantity of times of downsampling, or the like of each serial subnet in the start point network is adjusted according to the transformation policy, to obtain a transformed start point network. For example, when a depth of a serial subnet is less than a depth found in the transformation policy, a new block may be inserted into the serial subnet, to increase the depth of the serial subnet. For another example, when a width of a serial subnet is less than a width in the transformation policy, an input channel and an output channel of a block in the serial subnet may be adjusted, so that a transformed serial subnet complies with the width included in the transformation policy.

In addition, during swap and extension, to enable the transformed start point network to inherit the weight of the start point network before transformation, the block for swap or extension further needs to be processed. In an embodiment, in a swap process, convolution operations of adjacent blocks may be changed, so that a swapped start point network may reload a network parameter, such as the weight, of the start point network before transformation, thereby reducing a workload of adjusting the network parameter of the start point network. In an extension process, a newly inserted unit is obtained by initializing a weight as an identity matrix and performing group normalization, so that a transformed start point network can inherit a parameter of the start point network before transformation. It may be understood that, after the block included in the start point network is swapped or extended, a structure of the swapped or extended block may be changed, so that the structure of the swapped or extended block is similar to a structure of a block in a corresponding serial subnet in the start point network. For example, a width of the newly inserted unit is the same as a width of an inserted serial subnet, or a width of a transformed block is the same as a width of a block before transformation, so that the weight of the start point network before transformation can be inherited, thereby reducing a weight training process. Therefore, in an embodiment of the disclosure, the transformed start point network can be quickly obtained in a short time, and an evaluation result of the transformed start point network can be obtained, thereby improving efficiency of obtaining the serial network.

603: Determine whether the serial network meets the preset condition; and if yes, perform operation 604; or if no, perform operation 602.

After the at least one time of transformation is performed on the start point network to obtain the serial network, it is determined whether the serial network meets the preset condition. If the serial network meets the preset condition, the serial network may be trained by using a preset dataset. If the serial network does not meet the preset condition, the serial network may be used as a new start point network, and the first search space continues to search for a transformation policy, to continue to transform the new start point network.

In an embodiment, the preset condition may include but is not limited to: a second evaluation result of the serial network meets a first preset evaluation condition, a quantity of times of transformation performed on the serial network exceeds a preset quantity of times of transformation, or a quantity of times of training of the serial network does not exceed a preset quantity of times of training, where the second evaluation result is obtained by evaluating the serial network. The second evaluation result may be the first evaluation result of the start point network obtained after the at least one time of transformation in operation 602, or may be an evaluation result obtained by re-evaluating the serial network after the serial network is obtained. The second evaluation result may include but is not limited to a loss value of the start point network, a precision value of an output result, inference duration, or the like. Correspondingly, the first preset evaluation condition may include: the loss value of the start point network or the serial network is not greater than a first loss threshold, the precision value of the output result is greater than a first precision threshold, or the inference duration is less than a first inference threshold. The quantity of times of transformation performed on the serial network is a quantity of times of transformation performed on the start point network in operation 602. The quantity of times of training of the serial network does not exceed the preset quantity of times of training, that is, the quantity of times of training of the serial network by using the preset dataset in the following operation 604.

604: Train the serial network by using the preset dataset, to obtain the trained serial network.

After it is determined that the start point network meets the preset condition, the serial network is trained by using the preset dataset, to obtain the trained serial network.

The preset dataset may be understood as a full dataset, and includes a large amount of training data. For example, if the target neural network is used to perform at least one of image recognition, semantic segmentation, or object detection, the full dataset may be an ImageNet dataset, and includes a large amount of image data. Therefore, in an embodiment of the disclosure, the start point network is not trained each time the start point network is transformed by using the ImageNet dataset. Instead, the serial network is trained only after the at least one time of transformation is performed on the start point network and the preset condition is met. This can reduce a workload of training the serial network, and improve efficiency of obtaining the target neural network.

It may be understood that, generally, to improve accuracy of an output result of a finally obtained serial network, training needs to be performed by using a large quantity of datasets, for example, the ImageNet dataset or another dataset including a large amount of data. However, more resources need to be consumed for training by using the large quantity of datasets. In this disclosure, the serial network is trained by using the large amount of data only after the serial network meets the preset condition, and training does not need to be performed after each transformation, thereby reducing the workload of training the serial network and improving efficiency of obtaining the final serial network.

605: Determine whether the trained serial network meets a termination condition; and if yes, perform operation 606; or if no, perform operation 602.

After the serial network is trained by using the preset dataset, it is determined whether the trained serial network meets the termination condition. If the trained serial network meets the termination condition, the target neural network may be obtained based on the trained serial network, that is, operation 606 is performed. If the trained serial network does not meet the termination condition, after the first search space is updated, the trained serial network may be used as a new start point network, the at least one time of transformation is performed on the new start point network, and then the transformed start point network is used as the serial network again.

In an embodiment, the termination condition may include but is not limited to: the second evaluation result of the serial network meets a second preset evaluation condition, or the quantity of times of training of the serial network exceeds the preset quantity of times of training.

The second evaluation result may be the first evaluation result of the start point network obtained after the at least one time of transformation in operation 602, or may be an evaluation result obtained by re-evaluating the serial network after the serial network is obtained. The second evaluation result may include but is not limited to a loss value of the serial network, a precision value of an output result, inference duration, or the like. Correspondingly, the second preset evaluation condition may include: the loss value of the serial network is not greater than a second loss threshold, the precision value of the output result is greater than a second precision threshold, or the inference duration is less than a second inference threshold. The quantity of times of training of the serial network does not exceed the preset quantity of times of training, that is, the quantity of times of training of the serial network by using the preset dataset in the following operation 604.

It should be understood that the second preset evaluation condition herein may be the same as or different from the foregoing first preset evaluation condition. When the second preset evaluation condition is different from the foregoing first preset evaluation condition, generally, that a network corresponding to the second preset evaluation condition is better than a network corresponding to the first preset evaluation condition may be that the second loss threshold is lower than the first loss threshold, the second precision threshold is higher than the first precision threshold, or the second inference threshold is lower than the first inference threshold.

606: Obtain the target neural network based on the trained serial network.

After it is determined that the trained serial network meets the termination condition, the target neural network may be obtained based on the trained serial network.

In an embodiment, the target task may be further obtained, and the target neural network is used to execute the target task. For example, before operation 601, the target task may be obtained. In operation 601, the start point network may be selected based on the target task, and the subsequently obtained target neural network may be used to execute the target task.

In an embodiment, obtaining the target neural network based on the trained serial network may include: if the trained serial network meets an output condition, using the trained serial network as the target neural network; or if the trained serial network does not meet the output condition, obtaining a parallel subnet corresponding to the trained serial network, and constructing the target neural network based on the trained serial network and the parallel subnet corresponding to the trained serial network.

Generally, the serial network includes a plurality of serial subnets, and each serial subnet includes one or more blocks. The obtaining a parallel subnet corresponding to the trained serial network may include: determining, within a preset quantity range, a quantity of parallel subnets corresponding to each serial subnet in the serial network; and constructing, based on the quantity of parallel subnets corresponding to each serial subnet, the parallel subnet corresponding to each serial subnet. In addition, a structure of the parallel subnet corresponding to each serial subnet is generally the same as a structure of the serial subnet. For example, if the quantity of parallel subnets corresponding to the serial subnet 1 is 1, one parallel subnet corresponding to the serial subnet 1 may be constructed. A structure of the parallel subnet is the same as that of the serial subnet 1, or is obtained after the serial subnet 1 is transformed.

In an embodiment, the constructing the target neural network based on the serial network and the parallel subnet corresponding to each serial subnet may include: constructing a temporary neural network based on the serial network and the parallel subnet corresponding to each serial subnet; evaluating the temporary neural network to obtain a third evaluation result; and if the third evaluation result meets the output condition, using the temporary neural network as the target neural network; or if the third evaluation result does not meet the output condition, re-obtaining a parallel subnet corresponding to the serial network. The third evaluation result is similar to the foregoing first evaluation result or the second evaluation result, and details are not described herein again. Still further, for a procedure of obtaining the target neural network by constructing the parallel subnet corresponding to each serial subnet in the serial network, refer to related descriptions of the following operations 1012 to 1017. Details are not described herein again.

It may be understood that when the serial network meets the output condition, the serial network may be directly used as the target neural network, to efficiently and accurately obtain the target neural network. When the serial network meets the termination condition but does not meet the output condition, the parallel subnet corresponding to the trained serial network may be obtained, and the target neural network is constructed based on the trained serial network and the parallel subnet corresponding to the trained serial network.

Figure 9:
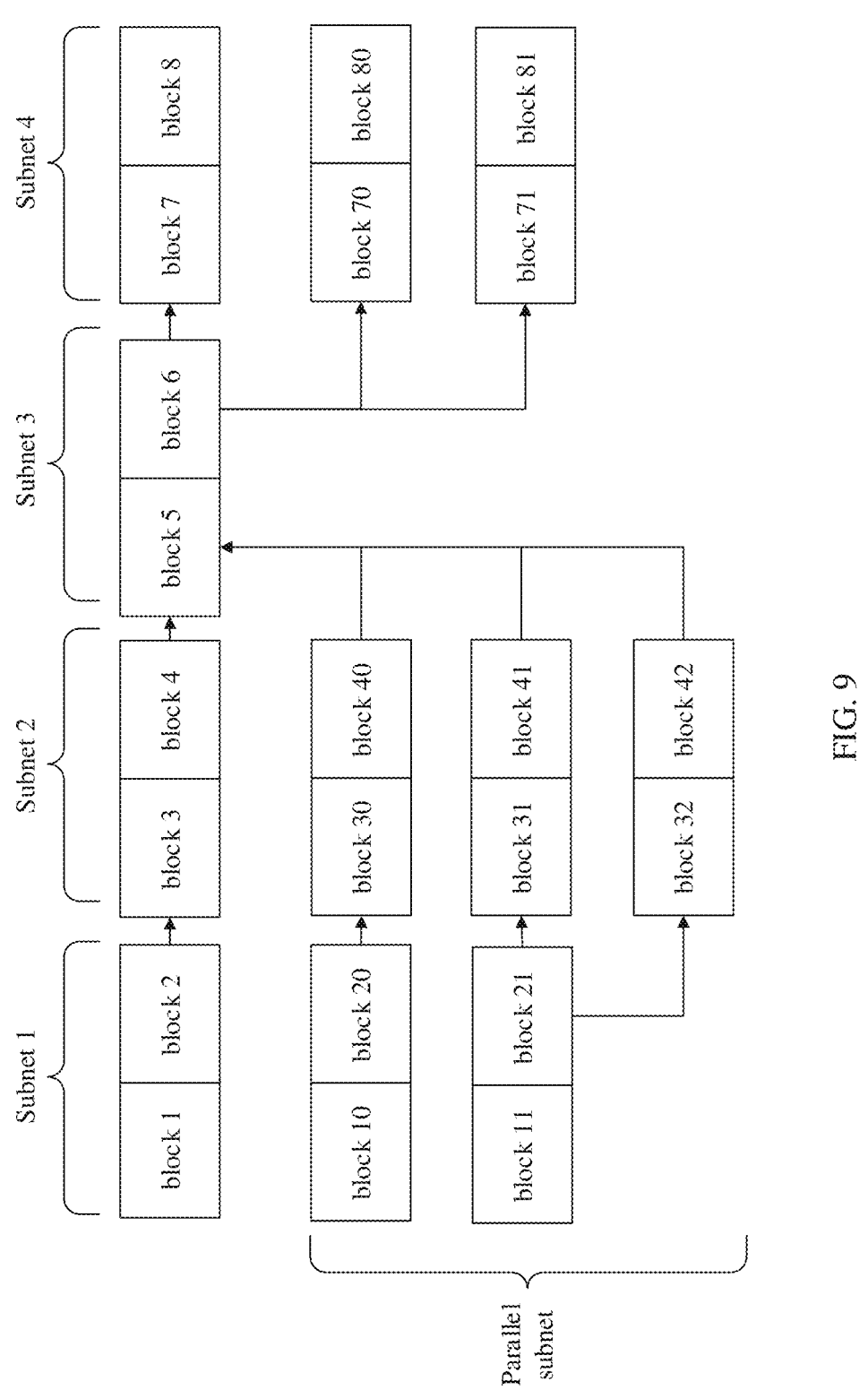
FIG. 9 is a schematic diagram of a neural network construction manner according to an embodiment of this disclosure.

For example, as shown in FIG. 9, the serial network includes a serial subnet 1, a serial subnet 2, a serial subnet 3, and a serial subnet 4. A quantity of parallel subnets corresponding to the serial subnet 1 is 2, a quantity of parallel subnets corresponding to the serial subnet 2 is 3, a quantity of parallel subnets corresponding to the serial subnet 3 is 0, and a quantity of parallel subnets corresponding to the serial subnet 4 is 2. In a neural network shown in FIG. 9, a transmission direction from the serial subnet 1 to the serial subnet 4 is referred to as a row, and the serial subnet 1 and the parallel subnets parallel to the serial subnet 1 are referred to as a column. Generally, after the structure of the parallel subnet corresponding to each serial subnet is constructed, two adjacent rows in a same column are usually connected. For example, as shown in FIG. 9, an input of a block 30 is an output of a block 20. When no adjacent parallel subnet exists in a same column of a parallel subnet, the parallel subnet may be connected to a serial subnet in an adjacent serial network. For example, an output of a block 6 in the serial subnet 3 may be used as inputs of a block 70 and a block 71, and the block 70 and the block 71 are blocks in parallel subnets corresponding to the serial subnet 4.

In an embodiment, the output condition may include but is not limited to: precision is greater than a first threshold; average precision is greater than a second threshold; the loss value is not greater than a third threshold; or the inference duration is not greater than a fourth threshold, and floating-point operations per second is not greater than a fifth threshold. The average precision is an average value of a plurality of precisions obtained by evaluating a neural network for a plurality of times, and the inference duration is duration for obtaining an output result from the neural network based on an input.

Therefore, in an embodiment of the disclosure, the at least one time of transformation may be performed on the start point network to obtain the serial network. The serial network is trained by using the preset dataset only when the serial network meets the preset condition, and a transformed start point network does not need to be trained each time the start point network is transformed. This reduces a workload and improves efficiency of obtaining the target neural network. In addition, a transformed start point network may inherit a weight of the start point network before transformation and the inherited weight is updated by using the lightweight dataset, to quickly train the transformed start point network, quickly obtain a serial network that meets a requirement, and further improve efficiency of obtaining the target neural network. In addition, the neural network construction method provided in this disclosure may adapt to different scenarios, and the serial network may be searched for based on different requirements. The neural network construction method provided in this disclosure can be oriented to more complex visual tasks and has a strong generalization capability. Therefore, costs of constructing different neural networks can be reduced, output accuracy of the constructed neural networks can be improved, and user experience can be improved.

Figure 10A:
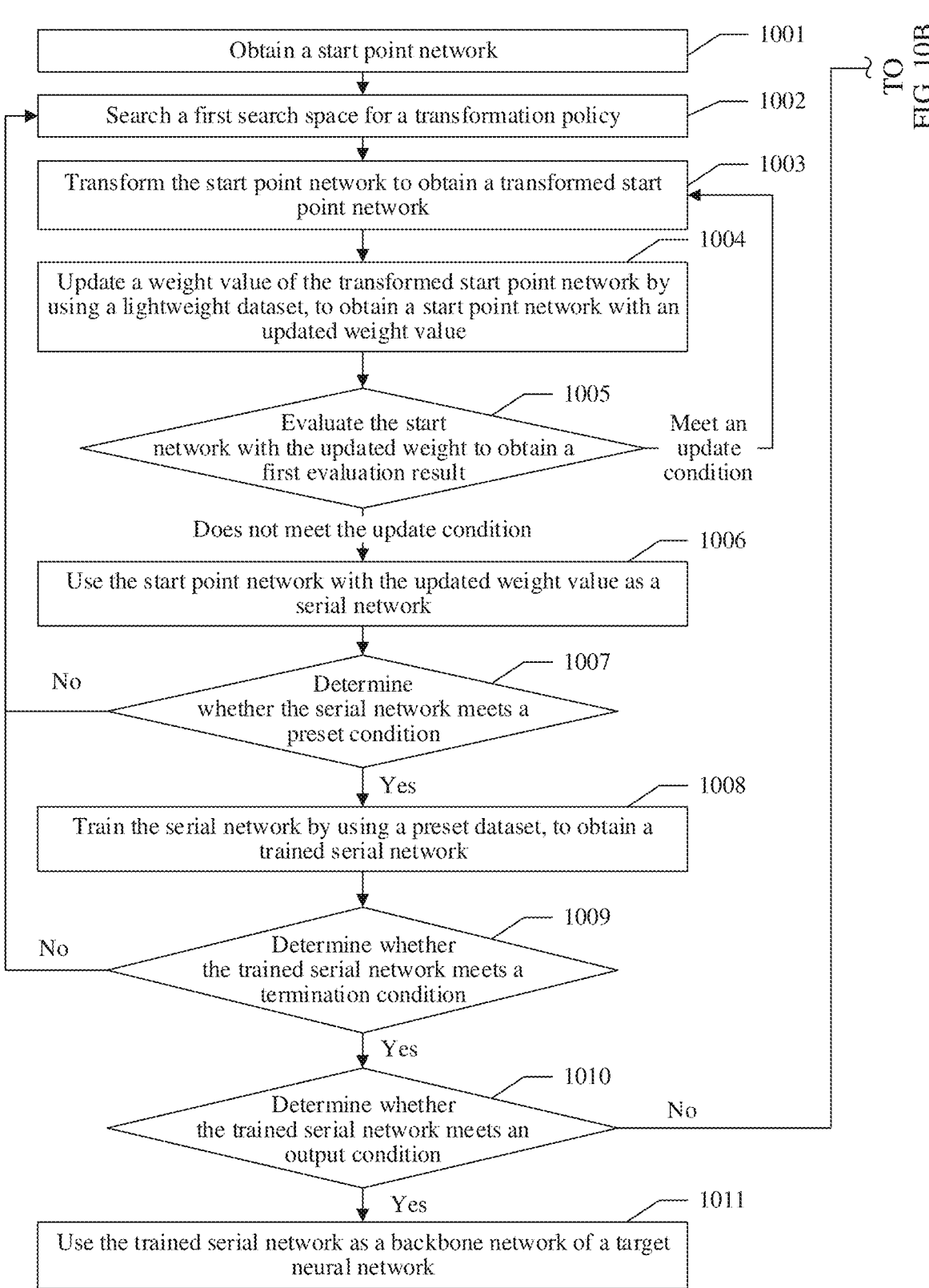

The foregoing describes in detail the procedure of the neural network construction method provided in this disclosure. For ease of understanding, the following describes in more detail a complete procedure of the neural network construction method provided in this disclosure by using an example. FIG. 10A and FIG. 10B are a schematic flowchart of another neural network construction method according to an embodiment of the disclosure. The method includes the following operations.

It should be noted that, for ease of understanding, in this disclosure, construction of the target neural network is divided into a plurality of phases, including a first phase and a second phase. The first phase is a serial-searching phase, and is a process of obtaining the serial network. The second phase is a parallel-searching phase, and is a process of obtaining the parallel subnet and constructing the target neural network. The second phase is an optional phase. When the serial network obtained in the first phase meets the output condition, the serial network may be used as the target neural network, which may be adjusted based on an actual application scenario. Details are separately described below.

First Phase: Serial-Searching Phase

1001: Obtain a start point network.

1002: Search a first search space for a transformation policy.

1003: Transform the start point network to obtain a transformed start point network.

1004: Update a weight of the transformed start point network by using a lightweight dataset, to obtain a start point network with an updated weight.

1005: Evaluate the start point network with the updated weight to obtain a first evaluation result; and if the first evaluation result meets an update condition, perform operation 1003; or if the first evaluation result does not meet the update condition, perform operation 1006.

1006: Use the start point network with the updated weight as a serial network.

1007: Determine whether the serial network meets a preset condition; and if no, perform operation 1002; or if yes, perform operation 1008.

1008: Train the serial network by using a preset dataset to obtain a trained serial network.

1009: Determine whether the trained serial network meets a termination condition; and if yes, perform operation 1010; or if no, perform operation 1002.

1010: Determine whether the trained serial network meets an output condition; and if yes, perform operation 1011; or if no, perform operation 1012.

1011: Use the trained serial network as a backbone network of the target neural network.

For operations 1001 to 1011, refer to related descriptions in the foregoing operations 601 to 606. Details are not described herein again.

Figure 11:
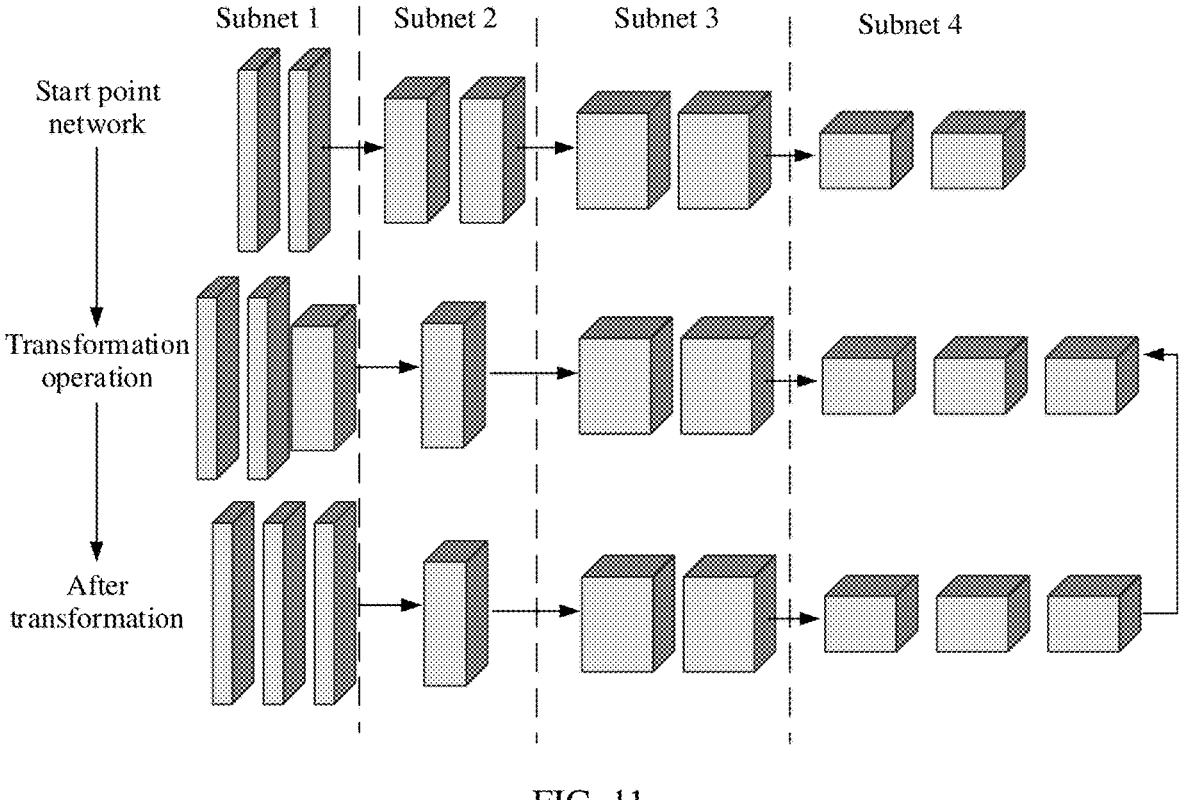
FIG. 11 is a schematic diagram of another network transformation manner according to an embodiment of this disclosure.

For example, a scenario is used as an example. As shown in FIG. 11, the start point network includes a serial subnet 1, a serial subnet 2, a serial subnet 3, and a serial subnet 4. After the transformation policy is found in the first search space, the serial subnets included in the start point network are transformed, which may include swap or extension. A convolution operation of a swapped block may be changed, so that the block with the changed convolution operation may inherit a weight of a serial subnet in the start point network before transformation. In addition, an extended block is obtained after group normalization is performed based on an identity matrix. Therefore, the extended block may also inherit a weight of a corresponding serial subnet. When the serial network, namely, the transformed start point network, meets the preset condition, the serial network may be further trained, that is, a reignite process is started, to obtain the target neural network. The preset condition may be understood as a trigger condition for performing a reignite on the serial network. If the transformed start point network does not meet the preset condition, the trained serial network is used as a new start point network, and the new start point network is re-transformed, so that a serial network that meets a stop condition can be subsequently obtained.

Second Phase: Parallel-Searching Phase

1012: Determine, within a preset quantity range, a quantity of parallel subnets corresponding to each serial subnet in a plurality of serial subnets.

After the serial network that meets the termination condition but does not meet the output condition is obtained, the quantity of parallel subnets corresponding to each serial subnet is determined within the preset quantity range, and the parallel subnet is constructed based on the quantity.

For example, the serial network may include L feature stages, and a structure of a parallel subnet is the same as that of a serial subnet at a same feature stage. If a maximum quantity of parallel subnets allowed to exist at each feature stage is K, structures of the parallel subnets may be encoded as "$k_1, k_2, \ldots, k_L$", and a second search space may be constructed. The second search space includes a range of a quantity of parallel subnets corresponding to each serial subnet, and is used to search and determine the quantity of parallel subnets corresponding to each serial subnet. A size of the second search space is $K^L$. For example, if a quantity of parallel subnets allowed to be added to each feature stage is 3, that is, K=3, and a quantity of feature stages is 10, the size of the second search space may be $3^{10}$. In addition, "," may alternatively be used to segment feature stages of different resolution, that is, indicate a location of downsampling. Generally, between two adjacent feature stages, resolution corresponding to a latter feature stage is halved compared with resolution corresponding to a former feature stage. Certainly, the resolution corresponding to the latter feature stage may alternatively be the same as the resolution corresponding to the former feature stage.

In addition, when the quantity of parallel subnets corresponding to each feature stage is searched within the preset quantity range, a random search manner may be used, or a preset resource constraint condition may be used as a constraint for sampling. For example, sampling may be performed by using FLOPS, inference duration, video memory usage, CPU usage, or the like as a resource constraint condition. For example, generally, a probability of adding a parallel subnet to each feature stage is inversely proportional to FLOPS of a to-be-added serial subnet, or a quantity of parallel subnets added to each feature stage is inversely proportional to the inference duration, the video memory usage, the CPU usage, or the like. Therefore, in an embodiment of the disclosure, sampling may be performed in a plurality of manners such as random sampling, an evolution algorithm, or a resource constraint condition, so that a quantity of parallel subnets corresponding to a requirement of a target task can be obtained, thereby accelerating a process of searching for the quantity of parallel subnets, and improving efficiency of obtaining the target neural network.

1013: Construct, based on the quantity of parallel subnets corresponding to each serial subnet, the parallel subnet corresponding to each serial subnet.

After the quantity of parallel subnets corresponding to each serial subnet in the serial network is obtained, the parallel subnet corresponding to each serial subnet is constructed. Generally, a structure of a parallel subnet corresponding to each serial subnet is the same as a structure of a serial subnet in the corresponding serial network. For example, if a serial subnet in the serial network includes a block 2 and a block 3, and a quantity of corresponding parallel subnets is 3, the block 2 and the block 3 may be copied for three times, to obtain three parallel subnets.

1014: Construct a temporary neural network based on the serial network and the parallel subnet corresponding to each serial subnet.

After the parallel subnet corresponding to each serial subnet in the serial network is constructed, the parallel subnet is added to the serial network to obtain the temporary neural network.

Figure 12:
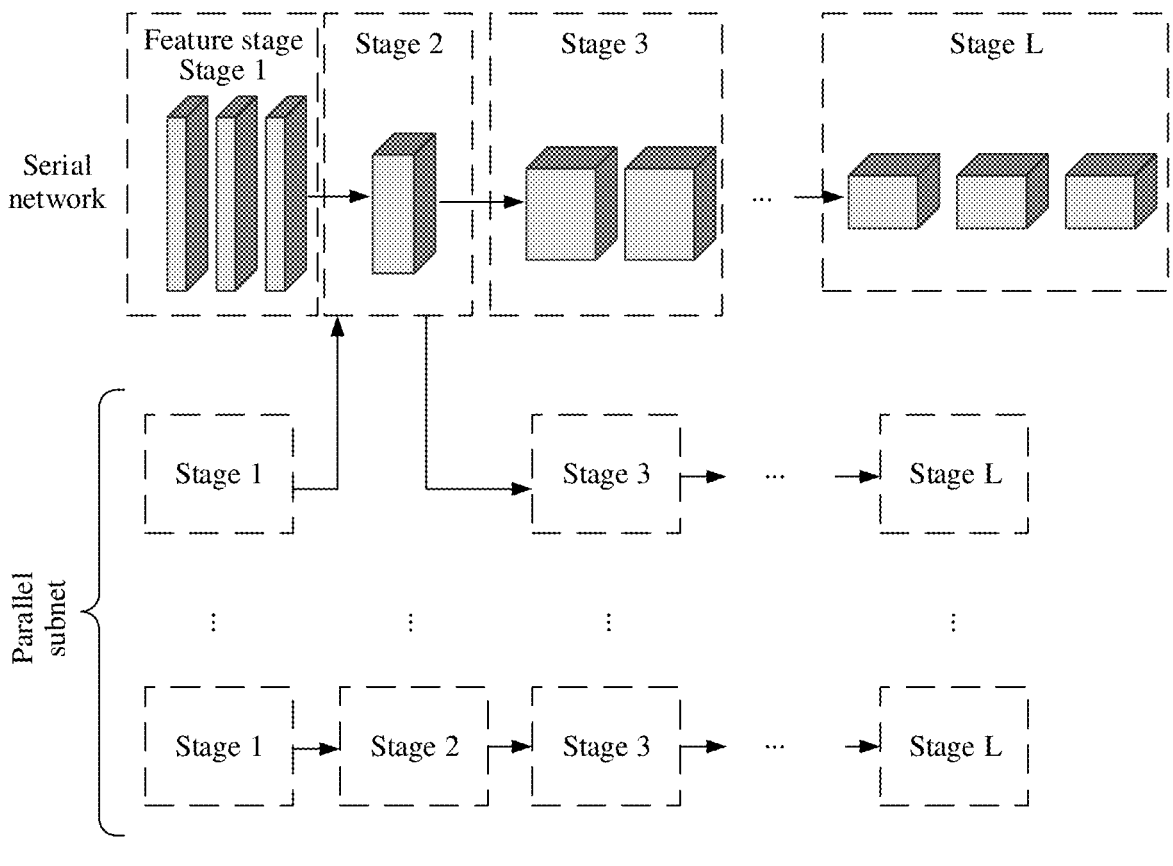
FIG. 12 is a schematic diagram of another neural network construction manner according to an embodiment of this disclosure.

For example, as shown in FIG. 12, the serial network may include L feature stages, that is, L Stages. The serial network may be represented as SerialNet=$s_L(s_{L-1}( \ldots s_1(x)))$, l=1, 2 . . . L, where x is input data of the serial network; L is feature stages of the serial network, that is, a quantity of serial subnets included in the serial network; and $s_l$ represents a structure of a serial subnet at a $l^{th}$ feature stage. That the structure of the parallel subnet is the same as that of the serial subnet in the serial network at the same feature stage may be understood that a structure of a Stage 1 in the serial network is the same as that of a parallel subnet Stage 1 at a same stage. For example, the structure of the parallel subnet corresponding to the serial subnet Stage 1 may be the same as that of the Stage 1. After the parallel subnet corresponding to each serial subnet is constructed, a connection manner of each parallel subnet is constructed. Generally, an input of a parallel subnet may be an output of a parallel subnet that is located in a same column in a previous feature stage. For example, $$p_l^k$$

may be used to represent a $k^{th}$ parallel subnet at a first feature stage. Generally, an input of $$p_l^k$$

is an output of $$p_{l-1}^k,$$

and the rest may be deduced by analogy. If $$p_{l-1}^k$$

does not exist, an output of $s_{l-1}$ may be used as the input of $$p_l^k.$$

Therefore, in an embodiment of the disclosure, after the serial network and the parallel subnet corresponding to each serial subnet are obtained, the temporary neural network may be constructed.

1015: Evaluate the temporary neural network to obtain a third evaluation result.

After the temporary neural network is obtained, the temporary neural network may be evaluated to obtain the third evaluation result.

In an embodiment, a process of evaluating the temporary neural network is similar to a process of evaluating the start point network or the serial network, and details are not described herein again. The third evaluation result may also include a loss value, precision, inference duration, FLOPS, average precision, and the like that correspond to an output result of the temporary neural network.

1016: Determine whether the third evaluation result meets the output condition; and if yes, perform operation 1017; or if no, perform operation 1012.

After the third evaluation result of the temporary neural network is obtained, it is determined whether the third evaluation result meets the output condition. If the third evaluation result meets the output condition, the temporary neural network may be used as the target neural network or the backbone network of the target neural network. If the third evaluation result does not meet the output condition, within the preset quantity range, the quantity of parallel subnets corresponding to each serial subnet may continue to be searched for, that is, operations 1012 to 1016 are repeated, until an obtained evaluation result of the temporary neural network meets the output condition.

In an embodiment, for the output condition, refer to related descriptions in operation 606. Details are not described herein again.

1017: Use the temporary neural network as the backbone network of the target neural network.

After it is determined that the output result of the temporary neural network meets the output condition, the temporary neural network may be used as the backbone network of the target neural network.

Generally, the backbone network may complete object detection on an image, and the target neural network may be used to perform one or more of image recognition, semantic segmentation, or object detection. Therefore, based on the backbone network, another network may be further added, so that the target neural network separately implements different functions. For example, headers with different functions may be added, so that the target neural network has different functions, which may be adjusted based on an actual application scenario.

Figure 13:
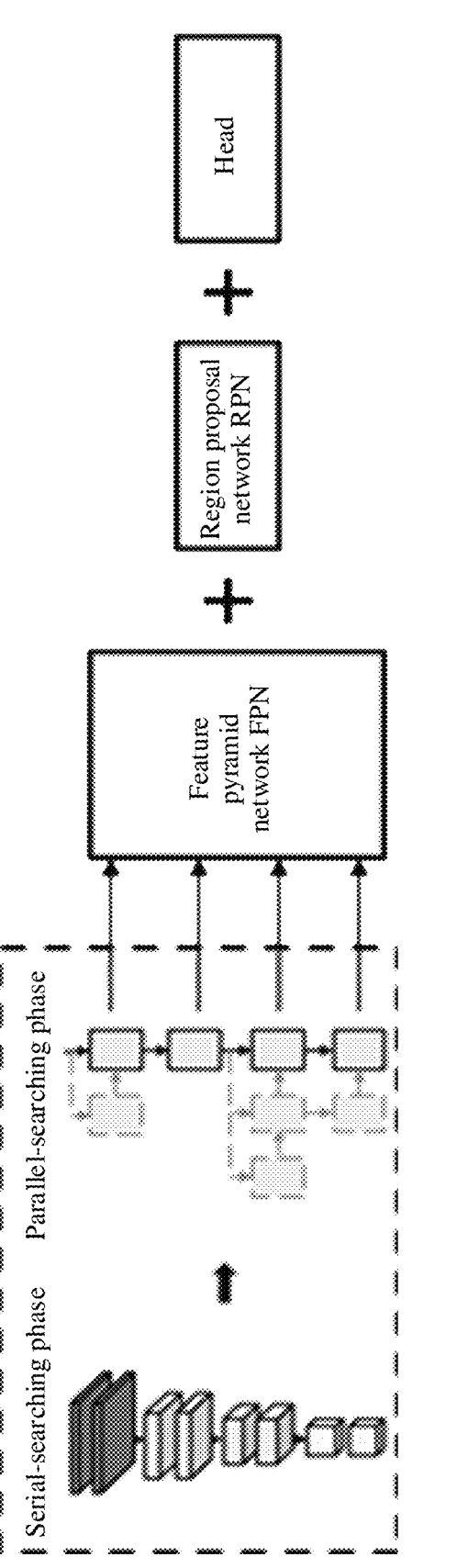
FIG. 13 is a schematic diagram of a structure of a neural network according to an embodiment of this disclosure.

For example, as shown in FIG. 13, after the backbone network is found in the serial-searching phase and the parallel-searching phase, an FPN, an RPN, and a Head are further added to the backbone network. The added FPN, RPN, and Head may be determined based on a requirement of the target task. For example, if image recognition, semantic segmentation, object detection, or the like needs to be performed, one or more Heads separately corresponding to image recognition, semantic segmentation, object detection, or the like may be added. Therefore, compared with using an existing classification network as the backbone network, in an embodiment of the disclosure, different functional networks may be added to the backbone network to adapt to different scenarios, so that the backbone network constructed in this disclosure has a strong generalization capability, and may also have high precision in different scenarios, thereby improving efficiency of constructing the target neural network.

Therefore, in an embodiment of the disclosure, a process of constructing the target neural network may be divided into two phases. In the serial-searching phase, the at least one time of transformation may be performed on the start point network to obtain the serial network. The serial network is trained by using the preset dataset only when the serial network meets the preset condition, and a transformed start point network does not need to be trained each time the start point network is transformed. This reduces a workload and improves efficiency of obtaining the target neural network. In addition, a transformed start point network may inherit a weight of the start point network before transformation and the inherited weight is updated by using a lightweight dataset, to quickly train the transformed start point network, quickly obtain a serial network that meets a requirement, and further improve efficiency of obtaining the target neural network. In the parallel-searching phase, the quantity of parallel subnets corresponding to each serial subnet in the serial network may be searched for by using the resource constraint condition corresponding to the target task as a constraint, so that the target neural network constructed by the found parallel subnet meets both the resource constraint and the output condition, to obtain a neural network with a more accurate output result.

For ease of understanding, the following describes, by using some application scenarios, effects implemented by the neural network construction method provided in this disclosure.

In a scenario in which the backbone network is trained by using different datasets, proportions of calculation amounts at different feature stages in the backbone network may be different. As shown in Table 1, for example, in different scenarios such as scenarios in which training is performed by using datasets such as ECP, BDD (Berkeley deep drive), COCO, and VOC (PASCAL VOC), different blocks such as a bottle neck unit (BNB), a basic block (BB), or a ResNeXt block (XB) are used as examples for description.

TABLE 1

| Dataset | Block | Target neural network structure | |
| (dataset) | type | Serial network | Parallel subnet |
|---|---|---|---|
| ECP BDD | BNB | 111d1111, d1111, 11d, 1111, 1111 1111111111d, 11111111111111111, d11111111111111111, d111111, 111, 1 | 0, 2, 1, 1, 0 0, 1, 2, 3, 0, 0 |
| COCO | | 1111d1, 11111111d, 11, 111111111111111d, 111111111111, 1 | 0, 0, 0, 0, 0, 2 |
| VOC | BB | 11d, 1111, d111111111, d111, 1, 1111 | 0, 0, 0, 0, 0, 0, |
| COCO | XB | 1111, d1111, d11111111111111111111111111, d11, 1 | 1, 0, 2, 1, 2 |

The first column indicates scenarios of different datasets, the second column indicates selection of network blocks, and the third column indicates a serial network structure in the serial-searching phase. "," indicates that different resolution separate each feature stage phase, and resolution of a next phase is halved compared with that of a previous phase. "1" indicates a regular block whose input and output channels are not changed, that is, the output channel is twice the input channel. "d" indicates that a quantity of basic channels in the block is doubled, that is, "2". The last column indicates a found parallel network structure. "," indicates different feature stage phases, and a number indicates a quantity of parallel subnets added to the feature stage.

The following briefly describes the different datasets.

COCO: A COCO 2017 dataset includes 80 object classes with 118K images for training and 5K images for testing.

The BDD is an autonomous driving dataset with 10 object classes, including 70K images for training and 10K images for testing.

The VOC includes 20 object classes, and includes 10K images for training and 4.9K images for testing.

The ECP is a largest pedestrian detection dataset and is classified into pedestrian and rider datasets, and includes 24K images for training and 4.3K images for testing.

An evaluation criterion may include: average precision (AP), a running speed (Inf time), and a log-average miss rate (LAMR). The AP considers precision under different thresholds, and average precision and average recall rates of objects of different sizes. The running speed: All methods are compared on a same graphics card to obtain a network architecture with higher precision at a same inference time. The LAMR indicates a log exponent of a quantity of positive cases in a testing set that are determined as negative cases/a quantity of desired positive cases found in the testing set plus a quantity of unwanted positive cases that are not detected. A lower criterion is better.

It can be learned from structures of the serial network and the parallel subnet of the target neural network that are obtained from Table 1 that, in a case of a target-complex COCO dataset, more complex semantic information and a larger field of view region are required to detect a target in an image. In a EuroCity Persons (ECP) dataset, there are a large quantity of small objects of a single type. Therefore, more calculation amounts need to be invested in a feature stage in which more spatial information is retained.

In addition, in different datasets, a backbone network (referred to as SPNet below) found by using the neural network construction method provided in this disclosure is greatly better than a model obtained by using an existing manual design (such as ResNext, HRNet, and DetNet) and an automatic search algorithm (such as DetNAS or NAS-FPN) in terms of FLOPS and detection precision.

In addition, on the COCO dataset, compared with a classic manually designed classification backbone network ResNext101, architectures SPNet (XB) and SPNet (BNB) found in this disclosure reduce FLOPS by nearly half (8.1 G vs 15.2 G) when mAP is improved by 7%. Compared with another backbone network HRNet-w48 manually designed for a detection task, an architecture E5 found in this disclosure improves mAP by nearly 6% at a similar running speed without using additional target segmentation labeling. Compared with object detection methods (such as AlignDet and NAS-FPN), the neural network construction method has significant advantages in running speed and detection performance. In the public datasets VOC and BDD by using an FPN detector, the backbone network found in this disclosure has significant performance improvement in precision and speed compared with the manually designed ResNet network or other automatic search algorithms. In an embodiment, for example, in a VOC scenario, the SPNet is improved by 3.2% and 2.8% respectively compared with DetNAS and Auto-FPN AP50 solutions. In a BDD scenario, the SPNet is faster than Auto-FPN and mAP of the SPNet is improved by 14%. In addition, in a public dataset VOC scenario, compared with DetNAS and NAS-FPN, in this disclosure, an architecture with better performance can be obtained through searching in less time. In addition, the network architecture found in this disclosure also has good generalization performance (all better than the manually designed backbone network ResNet101) on another dataset, and a more similar migration scenario (self-driving scenarios BDD and ECP) indicates better migration effect.

The foregoing describes in detail the methods provided in this disclosure, and the following describes apparatuses provided in this disclosure.

Figure 14:
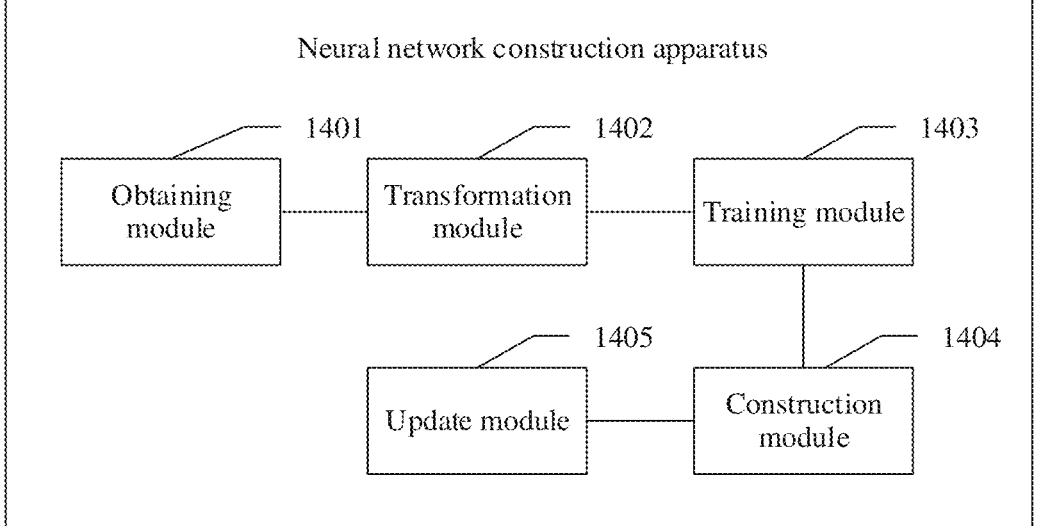
FIG. 14 is a schematic diagram of a structure of a neural network construction apparatus according to an embodiment of this disclosure.

FIG. 14 is a schematic diagram of a structure of a neural network construction apparatus according to an embodiment of the disclosure. The neural network construction apparatus may be configured to perform the procedures of the neural network construction methods shown in FIG. 6 to FIG. 13. The neural network construction apparatus includes:

an obtaining module 1401, configured to obtain a start point network, where the start point network includes a plurality of serial subnets;

a transformation module 1402, configured to perform at least one time of transformation on the start point network based on a preset first search space to obtain a serial network, where the first search space includes a range of parameters used for transforming the start point network;

a training module 1403, configured to: if the serial network meets a preset condition, train the serial network by using a preset dataset to obtain a trained serial network; and a construction module 1404, configured to: if the trained serial network meets a termination condition, obtain a target neural network based on the trained serial network.

In an embodiment, the transformation module 1402 may be configured to: search the preset first search space for a transformation policy, where the transformation policy includes a group of parameters used for transforming the start point network; transform the start point network according to the transformation policy to obtain a transformed start point network, where a weight of the transformed start point network is obtained by inheriting a weight of the start point network before transformation; update the weight of the transformed start point network by using a lightweight dataset, to obtain a start point network with an updated weight, where data included in the preset dataset is more than data included in the lightweight dataset; evaluate the start point network with the updated weight to obtain a first evaluation result; and if the first evaluation result meets a preset update condition, re-search the first search space for a transformation policy, and re-transform the start point network according to the re-found transformation policy; or if the first evaluation result does not meet the preset update condition, use the start point network with the updated weight as the serial network.

In an embodiment, the neural network construction apparatus may further include:

an update module 1405, configured to: if the serial network does not meet the preset condition, use the serial network as a new start point network; or if the trained serial network does not meet the termination condition, use the trained serial network as a new start point network; and update the first search space; and the transformation module is further configured to: re-search for a transformation policy based on an updated first search space, and re-transform the new start point network according to the re-found transformation.

In an embodiment, the update condition includes: a quantity of times of transformation performed on the start point network does not exceed a preset quantity of times, or the first evaluation result does not meet a preset convergence condition. The convergence condition includes one or more of the following: the first evaluation result is better than a threshold, or a difference between the first evaluation result and an evaluation result obtained in previous evaluation of the start point network is less than a preset value.

In an embodiment, the preset condition may include but is not limited to: a second evaluation result of the serial network meets a first preset evaluation condition, a quantity of times of transformation performed on the serial network exceeds a preset quantity of times of transformation, or duration from last time of transformation performed on the start point network exceeds a preset value, where the second evaluation result is obtained by evaluating the serial network.

The first preset evaluation condition includes one or more of the following: a loss value of the serial network is not greater than a first loss threshold, a precision value of an output result of the serial network is greater than a first precision threshold, or inference duration of the serial network is less than a first inference threshold.

In an embodiment, each serial subnet in the start point network includes one or more blocks, and the transformation module 1402 may be configured to: swap blocks included in two adjacent serial subnets in the plurality of serial subnets; or insert a block into one or more of the plurality of serial subnets, where the inserted block is obtained by initializing a weight as an identity matrix and performing group normalization.

In an embodiment, the termination condition may include but is not limited to: the second evaluation result of the serial network meets a second preset evaluation condition, or a quantity of times of training of the serial network exceeds a preset quantity of times of training.

In an embodiment, the construction module 1404 may be configured to: if the trained serial network meets an output condition, use the trained serial network as the target neural network; or if the trained serial network does not meet the output condition, obtain a parallel subnet corresponding to the trained serial network, and construct the target neural network based on the trained serial network and the parallel subnet corresponding to the trained serial network.

In an embodiment, the serial network includes a plurality of serial subnets, and each serial subnet includes one or more blocks. The construction module 1404 may be configured to: determine, within a preset quantity range, a quantity of parallel subnets corresponding to each serial subnet in the plurality of serial subnets; and construct, based on the quantity of parallel subnets corresponding to each serial subnet, the parallel subnet corresponding to each serial subnet, where a structure of each serial subnet is the same as a structure of the parallel subnet corresponding to each serial subnet.

In an embodiment, the construction module 1404 may be configured to: construct a temporary neural network based on the serial network and the parallel subnet corresponding to each serial subnet; evaluate the temporary neural network to obtain a third evaluation result; and if the third evaluation result meets the output condition, use the temporary neural network as the target neural network; or if the third evaluation result does not meet the output condition, re-obtain a parallel subnet corresponding to the serial network.

In an embodiment, the output condition includes but is not limited to one or more of the following: precision is greater than a first threshold; average precision is greater than a second threshold; the loss value is not greater than a third threshold; or the inference duration is not greater than a fourth threshold, and floating-point operations per second is not greater than a fifth threshold. The average precision is an average value of a plurality of precisions obtained by evaluating a neural network for a plurality of times, and the inference duration is duration for obtaining an output result from the neural network based on an input.

In an embodiment, types of parameters included in the first search space may include but are not limited to a width, a depth, a quantity of times of downsampling, and a location of downsampling. The width includes a quantity of input channels and a quantity of output channels of a block included in each serial subnet in the start point network, the depth is a quantity of blocks included in each serial subnet in the start point network, and downsampling is used to divide two adjacent serial subnets in the start point network.

In an embodiment, the target neural network is used to perform at least one of image recognition, semantic segmentation, or object detection, and the preset dataset may include an ImageNet dataset.

Figure 15:
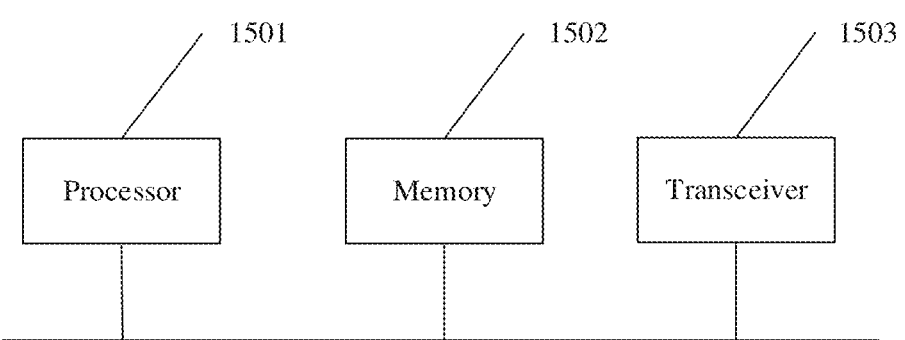
FIG. 15 is a schematic diagram of a structure of another neural network construction apparatus according to an embodiment of this disclosure.

In an embodiment, a manner of obtaining the start point network may include: obtaining a target task by using data input by a user, and then obtaining the start point network based on the target task. The constructed target neural network may be used to execute the target task. FIG. 15 is a schematic diagram of a structure of another neural network construction apparatus according to an embodiment of the disclosure.

The neural network construction apparatus may include a processor 1501 and a memory 1502. The processor 1501 and the memory 1502 are interconnected through a line. The memory 1502 stores program instructions and data.

Figure 4:
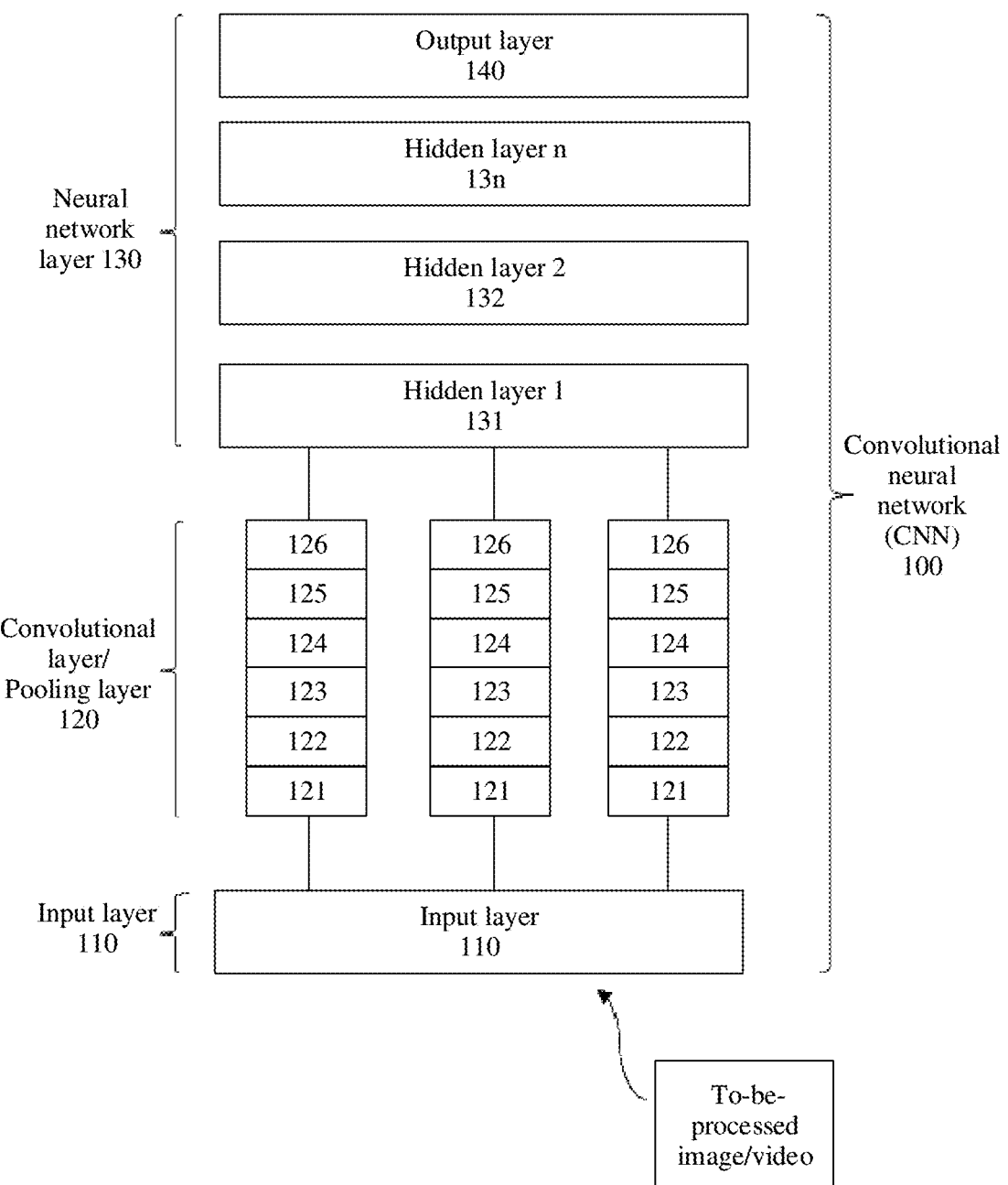
FIG. 4 is a schematic diagram of a structure of another convolutional neural network according to an embodiment of this disclosure.

The memory 1502 stores program instructions and data corresponding to the operations in FIG. 4 or FIG. 8.

The processor 1501 is configured to perform the method operations performed by the neural network construction apparatus shown in any one of the foregoing embodiments in FIG. 4 or FIG. 8.

In an embodiment, the neural network construction apparatus may further include a transceiver 1503, configured to receive or send data.

An embodiment of this disclosure further provides a computer-readable storage medium. The computer-readable storage medium stores a program used to generate a vehicle travel speed. When the program is run on a computer, the computer is enabled to perform the operations in the methods described in the embodiments shown in FIG. 4 to FIG. 8.

In an embodiment, the neural network construction apparatus shown in FIG. 15 is a chip.

An embodiment of this disclosure further provides a neural network construction apparatus. The neural network construction apparatus may also be referred to as a digital processing chip or a chip. The chip includes a processing unit and a communication interface. The processing unit obtains program instructions through the communication interface, and when the program instructions are executed by the processing unit, the processing unit is configured to perform the method operations performed by the neural network construction apparatus shown in any one of the foregoing embodiments in FIG. 6 or FIG. 10A and FIG. 10B.

An embodiment of this disclosure further provides a digital processing chip. A circuit and one or more interfaces that are configured to implement functions of the processor 1501 or the processor 1501 are integrated into the digital processing chip. When a memory is integrated into the digital processing chip, the digital processing chip may complete the method operations in any one or more of the foregoing embodiments. When a memory is not integrated into the digital processing chip, the digital processing chip may be connected to an external memory through a communication interface. The digital processing chip implements, based on program code stored in the external memory, the actions performed by the neural network construction apparatus in the foregoing embodiments.

An embodiment of this disclosure further provides a computer program product. When the computer program product runs on a computer, the computer is enabled to perform the operations performed by the neural network construction apparatus in the methods described in the embodiments shown in FIG. 6 to FIG. 13.

The neural network construction apparatus provided in embodiments of this disclosure may be a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the server performs the neural network construction method described in the embodiments shown in FIG. 4 to FIG. 8. In an embodiment, the storage unit is a storage unit in the chip, for example, a register or a cache; or the storage unit may be a storage unit that is in a radio access device end and that is located outside the chip, for example, a read-only memory (ROM), another type of static storage device that can store static information and instructions, or a random access memory (RAM).

In an embodiment, the processing unit or the processor may be a central processing unit (CPU), a neural network processing unit (NPU), a graphics processing unit (GPU), a digital signal processor (DSP), an application-specific integrated circuit (ASIC), a field programmable gate array (FPGA), another programmable logic device, a discrete gate, a transistor logic device, a discrete hardware component, or the like. A general-purpose processor may be a microprocessor or any regular processor or the like.

Figure 16:
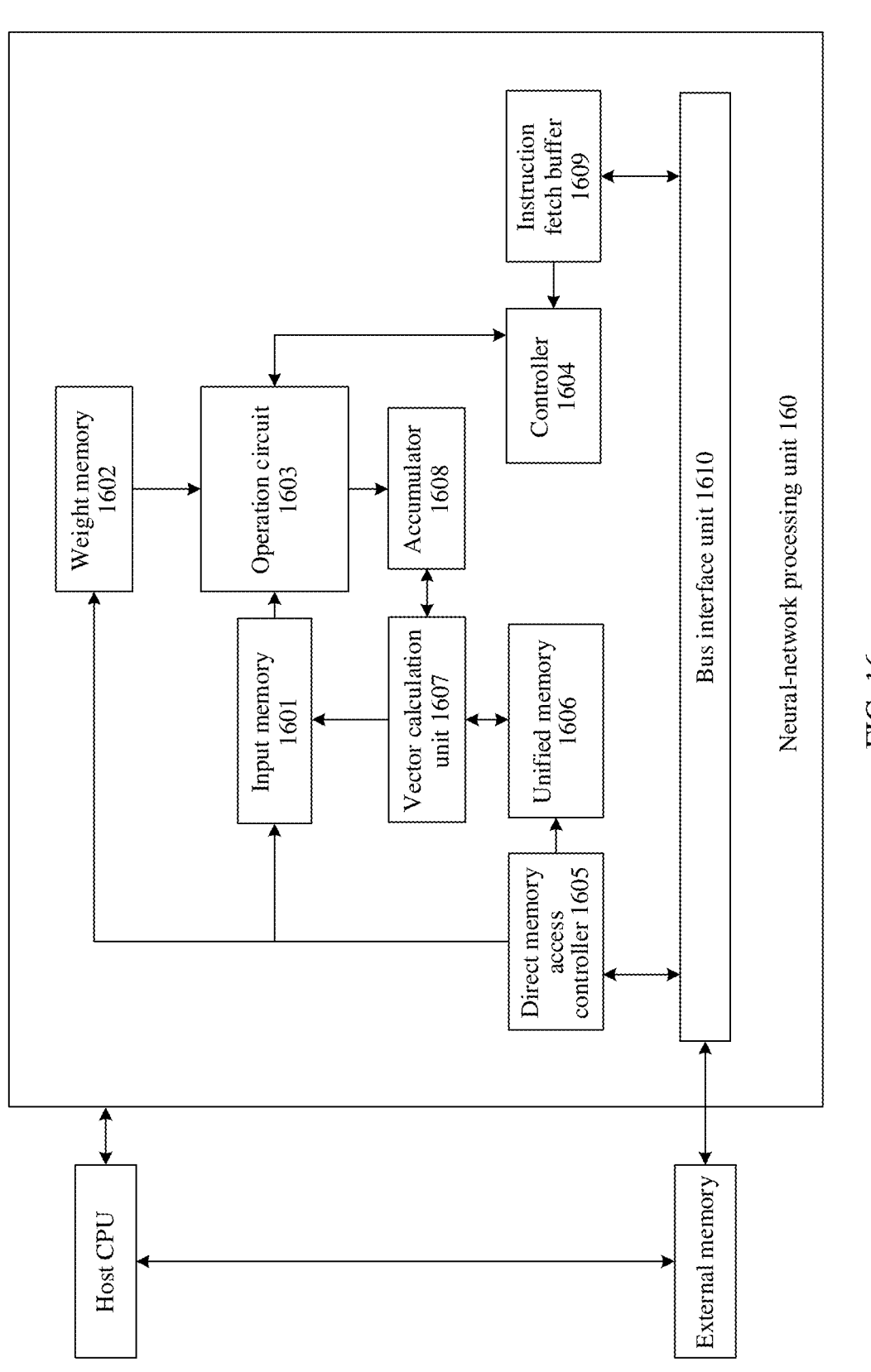
FIG. 16 is a schematic diagram of a structure of a chip according to an embodiment of this disclosure.

For example, refer to FIG. 16. FIG. 16 is a schematic diagram of a structure of a chip according to an embodiment of this disclosure. The chip may be represented as a neural-network processing unit NPU 160. The NPU 160 is mounted to a host CPU as a coprocessor, and the host CPU allocates a task. A core part of the NPU is an operation circuit 1603, and a controller 1604 controls the operation circuit 1603 to extract matrix data in a memory and perform a multiplication operation.

In an embodiment, the operation circuit 1603 includes a plurality of processing engines (PE) inside. In an embodiment, the operation circuit 1603 is a two-dimensional systolic array. The operation circuit 1603 may alternatively be a one-dimensional systolic array or another electronic circuit capable of performing mathematical operations such as multiplication and addition. In an embodiment, the operation circuit 1603 is a general-purpose matrix processor.

For example, it is assumed that there is an input matrix A, a weight matrix B, and an output matrix C. The operation circuit fetches data corresponding to the matrix B from a weight memory 1602, and buffers the data on each PE in the operation circuit. The operation circuit fetches data of the matrix A from an input memory 1601 to perform a matrix operation on the matrix B, to obtain a partial result or a final result of the matrix, which is stored in an accumulator 1608.

A unified memory 1606 is configured to store input data and output data. Weight data is directly transferred to the weight memory 1602 by using a direct memory access controller (DMAC) 1605. The input data is also transferred to the unified memory 1606 by using the DMAC.

A bus interface unit (BIU) 1610 is configured to interact with the DMAC and an instruction fetch buffer (IFB) 1609 through an AXI bus.

The bus interface unit (BIU) 1610 is used by the instruction fetch buffer 1609 to obtain instructions from an external memory, and is further used by the direct memory access controller 1605 to obtain original data of the input matrix A or the weight matrix B from the external memory.

The DMAC is mainly configured to transfer input data in the external memory DDR to the unified memory 1606, transfer weight data to the weight memory 1602, or transfer input data to the input memory 1601.

A vector calculation unit 1607 includes a plurality of operation processing units. If required, further processing is performed on an output of the operation circuit, for example, vector multiplication, vector addition, an exponential operation, a logarithmic operation, or size comparison. The vector calculation unit 1107 is mainly configured to perform network calculation at a non-convolutional/fully connected layer in a neural network, for example, batch normalization, pixel-level summation, and upsampling on a feature map.

In an embodiment, the vector calculation unit 1607 can store a processed output vector in the unified memory 1606. For example, the vector calculation unit 1607 may apply a linear function or a non-linear function to the output of the operation circuit 1603, for example, perform linear interpolation on a feature map extracted at a convolutional layer. For another example, the linear function or the non-linear function is applied to a vector of an accumulated value to generate an activation value. In an embodiment, the vector calculation unit 1607 generates a normalized value, a pixel-level summation value, or both. In an embodiment, the processed output vector can be used as an activation input into the operation circuit 1603, for example, to be used in a subsequent layer in the neural network.

The instruction fetch buffer 1609 connected to the controller 1604 is configured to store instructions used by the controller 1604.

The unified memory 1606, the input memory 1601, the weight memory 1602, and the instruction fetch buffer 1609 are all on-chip memories. The external memory is private for the NPU hardware architecture.

An operation at each layer in a recurrent neural network may be performed by the operation circuit 1603 or the vector calculation unit 1607.

The processor mentioned above may be a general-purpose central processing unit, a microprocessor, an ASIC, or one or more integrated circuits for controlling program execution of the methods in FIG. 6 to FIG. 13.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected based on actual needs to achieve the objectives of the solutions of embodiments. In addition, in the accompanying drawings of the apparatus embodiments provided in this disclosure, connection relationships between modules indicate that the modules have communication connections with each other, which may be implemented as one or more communication buses or signal cables.

Based on the description of the foregoing implementations, one of ordinary skilled in the art may clearly understand that this disclosure may be implemented by software in addition to necessary universal hardware, or certainly may be implemented by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a hardware structure used to achieve a same function may be in various forms, for example, in a form of an analog circuit, a digital circuit, or a dedicated circuit. However, as for this disclosure, software program implementation is a better implementation in most cases. Based on such an understanding, the technical solutions of this disclosure essentially or the part contributing to the conventional technology may be implemented in a form of a computer software product t. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the disclosure.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer instructions are loaded and executed on the computer, the procedures or functions according to embodiments of this disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

In the specification, claims, and accompanying drawings of this disclosure, the terms "first", "second", "third", "fourth", and so on (if existent) are intended to distinguish between similar objects but do not necessarily indicate an order or sequence. It should be understood that data termed in such a way is interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

Finally, it should be noted that the foregoing descriptions are merely implementations of this disclosure, but the protection scope of this disclosure is not limited thereto. Any variation or replacement readily figured out by one of ordinary skilled in the art within the technical scope disclosed in this disclosure shall fall within the protection scope of this disclosure. Therefore, the protection scope of this disclosure shall be subject to the protection scope of the claims.

What is claimed is:

1. A neural network construction method, comprising:
obtaining a start point network comprising a plurality of serial subnets;
performing at least one time of transformation on the start point network based on a first search space to obtain a serial network, wherein the first search space comprises a range of parameters used for transforming the start point network, wherein types of parameters included in the first search space include at least one of width, depth, a quantity of times of downsampling, or a location of downsampling;
if the serial network meets a preset condition, training the serial network by using a preset dataset to obtain a trained serial network; and
if the trained serial network meets a termination condition, obtaining a target neural network based on the trained serial network, wherein the obtaining the target neural network based on the trained serial network comprises:
if the trained serial network meets an output condition, using the trained serial network as the target neural network; or
if the trained serial network does not meet the output condition, obtaining a parallel subnet corresponding to the trained serial network, and constructing the target neural network based on the trained serial network and the parallel subnet corresponding to the trained serial network.

2. The method according to claim 1, wherein one of the at least one time of transformation performed on the start point network based on the first search space comprises:

searching the first search space for a transformation policy comprising a group of parameters used for transforming the start point network;
transforming the start point network according to the transformation policy to obtain a transformed start point network, wherein a weight of the transformed start point network inherits a weight of the start point network before transformation;
updating the weight of the transformed start point network by using a lightweight dataset, to obtain a start point network with an updated weight, wherein data comprised in the preset dataset is more than data comprised in the lightweight dataset;
evaluating the start point network with the updated weight to obtain a first evaluation result; and
if the first evaluation result meets a preset update condition, re-searching the first search space for a transformation policy, and re-transforming the start point network according to a re-found transformation policy; or
if the first evaluation result does not meet the preset update condition, using the start point network with the updated weight as the serial network.

3. The method according to claim 2, further comprising:
if the serial network does not meet the preset condition, using the serial network as a new start point network; or if the trained serial network does not meet the termination condition, using the trained serial network as a new start point network; and
updating the first search space, searching for a transformation policy based on an updated first search space, and transforming the new start point network according to the found transformation policy.

4. The method according to claim 2, wherein the preset update condition comprises:
a quantity of times of transformation performed on the start point network does not exceed a preset quantity of times, or the first evaluation result does not meet a preset convergence condition comprising one or more of: the first evaluation result better than a threshold, or a difference between the first evaluation result and an evaluation result obtained in previous evaluation of the start point network less than a preset value.

5. The method according to claim 2, wherein the preset condition comprises:
a second evaluation result of the serial network meets a first preset evaluation condition, a quantity of times of transformation performed on the serial network exceeds a preset quantity of times of transformation, or duration from last time of transformation performed on the start point network exceeds a preset value, wherein the second evaluation result is obtained by evaluating the serial network; and
the first preset evaluation condition comprises one or more of: a loss value of the serial network not greater than a first loss threshold, a precision value of an output result of the serial network greater than a first precision threshold, or inference duration of the serial network less than a first inference threshold.

6. The method according to claim 1, wherein each serial subnet in the start point network comprises one or more blocks, and the transforming the start point network comprises:
swapping blocks comprised in two adjacent serial subnets in the plurality of serial subnets; or
inserting a processed block into at least one serial subnet in the plurality of serial subnets, wherein the processed block is obtained by initializing a weight of a block as an identity matrix and/or performing group normalization on the block.

7. The method according to claim 1, wherein the termination condition comprises:

a second evaluation result of the serial network meets a second preset evaluation condition, or a quantity of times of training of the serial network exceeds a preset quantity of times of training.

8. The method according to claim 1, wherein the target neural network is used to perform at least one of image recognition, semantic segmentation, or object detection, and wherein the preset dataset comprises an ImageNet dataset.

9. A neural network construction apparatus, comprising:

a processor, a memory coupled to the processor to store instructions, which when executed by the processor, cause the neural network construction apparatus to perform operations, the operations comprising:

obtaining a start point network comprising a plurality of serial subnets;

performing at least one time of transformation on the start point network based on a first search space to obtain a serial network, wherein the first search space comprises a range of parameters used for transforming the start point network, wherein types of parameters included in the first search space include at least one of width, depth, a quantity of times of downsampling, or a location of downsampling;

if the serial network meets a preset condition, training the serial network by using a preset dataset to obtain a trained serial network; and if the trained serial network meets a termination condition, obtaining a target neural network based on the trained serial network, wherein the obtaining the target neural network based on the trained serial network comprises:

if the trained serial network meets an output condition, using the trained serial network as the target neural network; or if the trained serial network does not meet the output condition, obtaining a parallel subnet corresponding to the trained serial network, and constructing the target neural network based on the trained serial network and the parallel subnet corresponding to the trained serial network.

10. The neural network construction apparatus according to claim 9, wherein one of the at least one time of transformation performed on the start point network based on the first search space comprises:

searching the first search space for a transformation policy comprising a group of parameters used for transforming the start point network;

transforming the start point network according to the transformation policy to obtain a transformed start point network, wherein a weight of the transformed start point network inherits a weight of the start point network before transformation;

updating the weight of the transformed start point network by using a lightweight dataset, to obtain a start point network with an updated weight, wherein data comprised in the preset dataset is more than data comprised in the lightweight dataset;

evaluating the start point network with the updated weight to obtain a first evaluation result; and if the first evaluation result meets a preset update condition, re-searching the first search space for a transformation policy, and re-transforming the start point network according to a re-found transformation policy; or if the first evaluation result does not meet the preset update condition, using the start point network with the updated weight as the serial network.

11. The neural network construction apparatus according to claim 10, wherein the operations further comprises:

if the serial network does not meet the preset condition, using the serial network as a new start point network; or if the trained serial network does not meet the termination condition, using the trained serial network as a new start point network; and updating the first search space, searching for a transformation policy based on an updated first search space, and transforming the new start point network according to the found transformation policy.

12. The neural network construction apparatus according to claim 10, wherein the preset update condition comprises: a quantity of times of transformation performed on the start point network does not exceed a preset quantity of times, or the first evaluation result does not meet a preset convergence condition comprising one or more of: the first evaluation result better than a threshold, or a difference between the first evaluation result and an evaluation result obtained in previous evaluation of the start point network less than a preset value.

13. The neural network construction apparatus according to claim 10, wherein the preset condition comprises: a second evaluation result of the serial network meets a first preset evaluation condition, a quantity of times of transformation performed on the serial network exceeds a preset quantity of times of transformation, or duration from last time of transformation performed on the start point network exceeds a preset value, wherein the second evaluation result is obtained by evaluating the serial network; and the first preset evaluation condition comprises one or more of: a loss value of the serial network not greater than a first loss threshold, a precision value of an output result of the serial network greater than a first precision threshold, or inference duration of the serial network less than a first inference threshold.

14. The neural network construction apparatus according to claim 9, wherein each serial subnet in the start point network comprises one or more blocks, and the transforming the start point network comprises:

swapping blocks comprised in two adjacent serial subnets in the plurality of serial subnets; or inserting a processed block into at least one serial subnet in the plurality of serial subnets, wherein the processed block is obtained by initializing a weight of a block as an identity matrix and/or performing group normalization on the block.

15. The neural network construction apparatus according to claim 9, wherein the termination condition comprises:

a second evaluation result of the serial network meets a second preset evaluation condition, or a quantity of times of training of the serial network exceeds a preset quantity of times of training.

16. The neural network construction apparatus according to claim 9, wherein the target neural network is used to perform at least one of image recognition, semantic segmentation, or object detection, and wherein the preset dataset comprises an ImageNet dataset.

17. A non-transitory machine-readable storage medium having instructions stored therein, which when executed by a processor, cause the processor to perform operations, the operations comprising:

obtaining a start point network comprising a plurality of serial subnets;

performing at least one time of transformation on the start point network based on a first search space to obtain a serial network, wherein the first search space comprises a range of parameters used for transforming the start point network, wherein types of parameters included in the first search space include at least one or more of width, depth, a quantity of times of downsampling, or a location of downsampling;

if the serial network meets a preset condition, training the serial network by using a preset dataset to obtain a trained serial network; and if the trained serial network meets a termination condition, obtaining a target neural network based on the trained serial network, wherein the obtaining the target neural network based on the trained serial network comprises:

if the trained serial network meets an output condition, using the trained serial network as the target neural network; or if the trained serial network does not meet the output condition, obtaining a parallel subnet corresponding to the trained serial network, and constructing the target neural network based on the trained serial network and the parallel subnet corresponding to the trained serial network.

18. The non-transitory machine-readable storage medium according to claim 17, wherein one of the at least one time of transformation performed on the start point network based on the first search space comprises:

searching the first search space for a transformation policy comprising a group of parameters used for transforming the start point network;

transforming the start point network according to the transformation policy to obtain a transformed start point network, wherein a weight of the transformed start point network inherits a weight of the start point network before transformation;

updating the weight of the transformed start point network by using a lightweight dataset, to obtain a start point network with an updated weight, wherein data comprised in the preset dataset is more than data comprised in the lightweight dataset;

evaluating the start point network with the updated weight to obtain a first evaluation result; and if the first evaluation result meets a preset update condition, re-searching the first search space for a transformation policy, and re-transforming the start point network according to a re-found transformation policy; or if the first evaluation result does not meet the preset update condition, using the start point network with the updated weight as the serial network.

19. The non-transitory machine-readable storage medium according to claim 18, wherein the operations further comprises:

if the serial network does not meet the preset condition, using the serial network as a new start point network; or if the trained serial network does not meet the termination condition, using the trained serial network as a new start point network; and updating the first search space, searching for a transformation policy based on an updated first search space, and transforming the new start point network according to the found transformation policy.

20. The non-transitory machine-readable storage medium according to claim 18, wherein the preset update condition comprises:

a quantity of times of transformation performed on the start point network does not exceed a preset quantity of times, or the first evaluation result does not meet a preset convergence condition comprising one or more of: the first evaluation result better than a threshold, or a difference between the first evaluation result and an evaluation result obtained in previous evaluation of the start point network less than a preset value.

* * * * *